(12) United States Patent  
Kageyama

(10) Patent No.: US 9,924,094 B2  
(45) Date of Patent: Mar. 20, 2018

(54) IMAGE PICKUP APPARATUS CAPABLE OF CHANGING DRIVE MODE AND IMAGE SIGNAL CONTROL METHOD

(71) Applicant: CANON KABUSHIKI KAISHA, Tokyo (JP)

(72) Inventor: Takashi Kageyama, Yokosuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/551,224

(22) Filed: Nov. 24, 2014

(65) Prior Publication Data

US 2015/0146031 A1  May 28, 2015

(30) Foreign Application Priority Data

Nov. 25, 2013 (JP) .................. 2013-242742  
Nov. 25, 2013 (JP) .................. 2013-242743

(51) Int. Cl.  
*H04N 5/222* (2006.01)  
*H04N 5/335* (2011.01)  
(Continued)

(52) U.S. Cl.  
CPC ..... *H04N 5/23245* (2013.01); *H04N 5/23293* (2013.01); *H04N 5/23296* (2013.01); *H04N 5/343* (2013.01)

(58) Field of Classification Search  
CPC ..... G09G 2320/106; G09G 2340/0407; H04N 2201/02429; H04N 5/374; H04N 5/35572; H04N 5/3742; H04N 5/3696  
(Continued)

(56) References Cited

U.S. PATENT DOCUMENTS 7,728,931 B2 6/2010 Hoffmuller  
9,100,514 B2 8/2015 Gu et al.  
(Continued)

FOREIGN PATENT DOCUMENTS

CN 1950217 A 4/2007  
CN 101262552 B 6/2011  
(Continued)

OTHER PUBLICATIONS

Combined Search and Examination Report issued in GB Appln. No. 1601511.7 dated May 4, 2016.  
(Continued)

*Primary Examiner* — Xi Wang  
(74) *Attorney, Agent, or Firm* — Rossi, Kimms & McDowell LLP

(57) ABSTRACT

An image pickup apparatus capable of changing a live view photographing drive mode without causing freezing of live view display is demonstrated. When a switch is operated in a state where image signals output from an image pickup device sent via a first path are used for live view and image signals output from the image pickup device sent via a second path are used for AF, a drive mode of the image pickup device is changed such that image signals from the second path can be used for live view, then an acquisition destination of the live view signals is changed from the first path to the second path, then the drive mode is changed such that high-definition live view image signals are output from the first path, and then the acquisition destination of the live view signals is changed from the second path to the first path.

10 Claims, 19 Drawing Sheets

(51) Int. Cl.
*G03B 13/02* (2006.01)
*H04N 5/232* (2006.01)
*H04N 5/343* (2011.01)

(58) Field of Classification Search
USPC ........... 348/296, 333.01, 699, 311, 308, 321, 348/323; 396/311, 148
See application file for complete search history.

(56) References Cited

U.S. PATENT DOCUMENTS

| | | | |
|---|---|---|---|
| 2005/0052553 A1* | 3/2005 | Kido | H04N 3/1562 348/296 |
| 2005/0083419 A1* | 4/2005 | Honda | H04N 5/2353 348/244 |
| 2006/0018653 A1* | 1/2006 | Kido | G03B 15/05 396/310 |
| 2006/0197854 A1 | 9/2006 | Kubo | |
| 2007/0195182 A1 | 8/2007 | Ito | |
| 2008/0259202 A1 | 10/2008 | Fujii | |
| 2008/0259292 A1 | 10/2008 | Mertens et al. | |
| 2008/0291304 A1 | 11/2008 | Ota et al. | |
| 2011/0080503 A1 | 4/2011 | Okada et al. | |
| 2011/0128433 A1 | 6/2011 | Shiohara | |
| 2011/0142330 A1* | 6/2011 | Min | G06T 3/4046 382/159 |
| 2013/0038746 A1* | 2/2013 | Hosokawa | G03B 17/00 348/211.99 |
| 2013/0155265 A1* | 6/2013 | Bae | H04N 5/2173 348/208.11 |
| 2013/0242152 A1 | 9/2013 | Kasai | |
| 2013/0258149 A1* | 10/2013 | Choi | H04N 5/23212 348/294 |
| 2014/0118587 A1 | 5/2014 | Ikedo et al. | |
| 2014/0184866 A1 | 7/2014 | Ogushi et al. | |

FOREIGN PATENT DOCUMENTS

| | | |
|---|---|---|
| EP | 1791344 A2 | 5/2007 |
| EP | 2394428 A1 | 12/2011 |
| EP | 2424233 A2 | 2/2012 |
| GB | 2511405 A | 9/2014 |
| JP | 2003158684 A | 5/2003 |
| JP | 2005117276 A | 4/2005 |
| JP | 2005311665 A | 11/2005 |
| JP | 2007228433 A | 9/2007 |
| JP | 2012015721 A | 1/2012 |
| JP | 2012105225 A | 5/2012 |
| JP | 2013165443 A | 8/2013 |
| WO | 2010090056 A1 | 8/2010 |
| WO | 2011053678 A1 | 5/2011 |
| WO | 2013105672 A2 | 7/2013 |

OTHER PUBLICATIONS

British Search Report issued in counterpart application No. GB1420914.2, dated May 28, 2015.
Office Action issued in Japanese Patent Application No. 2013-242743 dated Aug. 8, 2017.
Examination Report issued in GB Patent Application No. 1601511.7 dated May 25, 2017.
Office Action issued in Chinese Patent Application No. 201410687648.0 dated May 19, 2017. English translation provided.

* cited by examiner

FIG. 4

| | | | | | | Row Number | Rows for AF | Rows for Normal Live View | Rows for High-Definition Live View A1 | Rows for High-Definition Live View A2 | Rows for High-Definition Live View B |
|---|---|---|---|---|---|---|---|---|---|---|---|
| R | Gr | R | Gr | R | Gr | 1 | O | | O | | |
| Gb | B | Gb | B | Gb | B | 2 | O | | O | | |
| R | Gr | R | Gr | R | Gr | 3 | | O | O | | O |
| Gb | B | Gb | B | Gb | B | 4 | | O | O | | O |
| R | Gr | R | Gr | R | Gr | 5 | | | | O | O |
| Gb | B | Gb | B | Gb | B | 6 | | | | O | O |
| R | Gr | R | Gr | R | Gr | 7 | | | | O | O |
| Gb | B | Gb | B | Gb | B | 8 | | | | O | O |

FIG. 15

| | | | | | | ROW NUMBER | ROWS FOR VIEW ANGLE A | ROWS FOR VIEW ANGLE B1 | ROWS FOR VIEW ANGLE B2 | ROWS FOR VIEW ANGLE C |
|---|---|---|---|---|---|---|---|---|---|---|
| R | Gr | R | Gr | R | Gr | 1 | O | | O | O |
| Gb | B | Gb | B | Gb | B | 2 | O | | O | O |
| R | Gr | R | Gr | R | Gr | 3 | | O | | O |
| Gb | B | Gb | B | Gb | B | 4 | | O | | O |
| R | Gr | R | Gr | R | Gr | 5 | | | O | O |
| Gb | B | Gb | B | Gb | B | 6 | | | O | O |
| R | Gr | R | Gr | R | Gr | 7 | | O | | O |
| Gb | B | Gb | B | Gb | B | 8 | | O | | O |

VIEW ANGLE A

VIEW ANGLE B1, VIEW ANGLE B2

VIEW ANGLE C

IMAGE PICKUP APPARATUS CAPABLE OF CHANGING DRIVE MODE AND IMAGE SIGNAL CONTROL METHOD

BACKGROUND OF THE INVENTION

Field of the Invention

The present invention relates to an image pickup apparatus capable of changing a drive mode, which is equipped with an image pickup sensor capable of simultaneously outputting image signals from two or more paths, and an image signal control method executed by the image pickup apparatus.

Description of the Related Art

Examples of an image pickup apparatus using an image pickup device, such as a CCD sensor and a CMOS sensor, include one equipped with a live view function. The live view function is a function that makes it possible to check an object image by sequentially displaying images based on image signals continuously read out from the image pickup device, on a display device, such as a liquid crystal display provided e.g. on a rear surface of the image pickup apparatus.

In a case where a battery is used as a power source of the image pickup apparatus, it is desirable to reduce power consumption for the live view display in a photographing standby state, but on the other hand, there is a case where high definition live view display is desired. To cope with this, there has been proposed a technique for switching a live view-displaying method between a live view display in a non-operated state and a live view display in a photographing preparation state (e.g. a state in which a shutter button is half pressed for an AF operation and the like on an object).

A technique for realizing the high-definition live view display has been proposed by e.g. Japanese Patent Laid-Open Publication No. 2012-105225. In Japanese Patent Laid-Open Publication No. 2012-105225, exposure time for pixels is controlled to be different between pixel areas, i.e. on a row-by-row basis, for example, to thereby acquire high-sensitivity pixel information and low-sensitivity pixel information, and output pixel values are determined based on these different types of pixel information representing respective different sensitivities to thereby make it possible to generate a wide dynamic range image.

However, to switch the live view display between the low image quality display in a low power consumption mode and a high definition display for photographing preparation, it is necessary to change the photographing drive mode for the live view. A time lag occurs when the photographing drive mode for the live view is changed, and hence the live view images cannot be obtained during the time lag, which causes freezing of the live view display or a recorded moving image (phenomenon that the same image is continuously displayed over an extended time period or the same image is continuously recorded).

Further, in the conventional image pickup apparatus, when a photographing drive mode for live view display or recording of a moving image is changed e.g. according to a change of a photographing view angle (angle of view), a time lag is generated when the photographing drive mode is changed similarly to the above, which makes it impossible to obtain images during the time lag. This causes the above-mentioned freezing of the live view display or the recorded moving image.

There has been proposed a technique for coping with this problem e.g. in Japanese Patent Laid-Open Publication No. 2007-228433. In the technique described in Japanese Patent Laid-Open Publication No. 2007-228433, an image pickup apparatus configured to perform image magnification by changing the photographing drive mode according to an electronic zoom magnification, performs gain correction dependent on a difference in exposure time on image data obtained before and after changing the photographing drive mode, for each readout row of pixels of the image pickup device. According to this processing, there is obtained image data for the live view display or the moving image recording, which is formed by giving continuity to image data items obtained before and after changing the photographing drive mode.

However, the technique described in Japanese Patent Laid-Open Publication No. 2007-228433 has a problem that the gain correction control performed in changing the photographing drive mode becomes complex. Further, there is a fear that the image quality of frame images obtained after the correction is degraded compared with the image quality of other frames which are not corrected, due to factors including a difference in gains used for the gain correction, which vary between areas.

SUMMARY OF THE INVENTION

The present invention provides a technique that makes it possible to change a live view photographing drive mode without causing freezing of the live view display.

The present invention also provides a technique that makes it possible to change a photographing drive mode for live view display and moving image recording without causing freezing of the live view display or the moving image recording, or deteriorating image quality.

In a first aspect of the present invention, there is provided an image pickup apparatus comprising an image pickup device including a plurality of pixels which are arranged in a row direction and a column direction, a drive unit configured to drive the image pickup device in one or a plurality of photographing modes, the photographing modes selected from a first photographing mode in which image signals are read out from pixels of predetermined readout rows of the image pickup device, a second photographing mode in which image signals are read out from a different number of readout rows than the number of the predetermined readout rows in the first photographing mode, and a third photographing mode in which readout rows of the image pickup device from which image signals are read out do not overlap with the readout rows in the first photographing mode or with the readout rows in the second photographing mode, an output unit including at least two output paths including a first output path and a second output path for separately outputting image signals read out from the image pickup device when at least two of the photographing modes selected from the first photographing mode, the second photographing mode, and the third photographing mode are executed, and a control unit configured, when a state in which image signals in the first photographing mode output from the first output path are used for image display on a display unit, and image signals in the third photographing mode output from the second output path are used for a use different from the image display, is changed to a state in which the image signals to be used for the image display are from the image signals in the second photographing mode, to temporarily change an acquisition destination of the image signals to be used for the image display from the first output path to the second output path, change the first photographing mode to the second photographing mode such that the image signals in the second photographing mode are output from the first output path, and change the acquisition destination of the image signals to be used for the image display from the second output path to the first output path.

In a second aspect of the present invention, there is provided an image pickup apparatus comprising an image pickup device including a plurality of pixels which are arranged in a row direction and a column direction, a drive unit configured to drive the image pickup device in one or a plurality of photographing modes, the photographing modes selected from a first photographing mode in which image signals are read out from pixels of predetermined rows of the image pickup device, a second photographing mode in which image signals are read out from a different number of readout rows than the number of the predetermined readout rows in the first photographing mode, and a third photographing mode and a fourth photographing mode in which readout rows of the image pickup device from which image signals are read out do not overlap with the readout rows in the first photographing mode or with the readout rows in the second photographing mode, an output unit including at least two output paths including a first output path and a second output path for separately outputting image signals read out from the image pickup device when at least two of the photographing modes selected from the first photographing mode, the second photographing mode, the third photographing mode, and the fourth photographing mode are executed, and a control unit configured, when a state in which image signals in the first photographing mode output from the first output path are used for image display on a display unit, and image signals in the third photographing mode output from the second output path are used for a use different from the image display, is changed to a state in which image signals to be used for the image display are from the image signals in the second photographing mode, to change the third photographing mode to the fourth photographing mode such that the image signals in the fourth photographing mode are output from the second output path, temporarily change an acquisition destination of the image signals to be used for the image display from the first output path to the second output path, change the first photographing mode to the second photographing mode such that the image signals in the second photographing mode are output from the first output path, change the acquisition destination of the image signals to be used for the image display from the second output path to the first output path, and change the fourth photographing mode to the third photographing mode such that the image signals in the third photographing mode are output from the second output path.

In a third aspect of the present invention, there is provided an image pickup apparatus comprising an image pickup device including a plurality of pixels which are arranged in a row direction and a column direction, a drive unit configured to drive the image pickup device in one or a plurality of photographing modes, the photographing modes selected from a first photographing mode in which image signals are read out from pixels of predetermined rows of the image pickup device, a second photographing mode in which image signals are read out from a different number of readout rows than the number of the predetermined readout rows in the first photographing mode, and a third photographing mode in which readout rows of the image pickup device from which image signals are read out do not overlap with the readout rows in the first photographing mode or with the readout rows in the second photographing mode, an output unit including at least two output paths including a first output path and a second output path for separately outputting image signals read out from the image pickup device when at least two of the photographing modes selected from the first photographing mode, the second photographing mode, and the third photographing mode are executed, and a control unit configured, when a state in which image signals in the first photographing mode output from the first output path are used for image display on a display unit, and image signals in the third photographing mode output from the second output path are used for a use different from the image display, is changed to a state in which image signals to be used for the image display are from the image signals in the second photographing mode, to temporarily stop processing for the use different from the image display using the image signals in the third photographing mode, start driving the image pickup device in the second photographing mode such that the image signals in the second photographing mode are output from the second output path, change an acquisition destination of the image signals to be used for the image display from the first output path to the second output path, change the first photographing mode to the third photographing mode such that the image signals in the third photographing mode are output from the first output path, and restart the processing for the use different from the image display using the image signals in the third photographing mode, which are output from the first output path.

In a fourth aspect of the present invention, there is provided an image pickup apparatus that is capable of acquiring image signals from an image pickup device via a first output path and a second output path, comprising a control unit configured, when image signals output from the first output path are used for live view on a display unit, and image signals output from the second output path are used for a use different from the live view, to change a mode of driving the image pickup device such that the image signals output from the second output path can be used for the live view display at a first definition level, change an acquisition destination of image signals to be used for the live view from the first output path to the second output path, change the mode of driving the image pickup device such that image signals which can be used for the live view at a second definition level different from the first definition level are output from the first output path, and change the acquisition destination of the image signals to be used for the live view from the second output path to the first output path.

In a fifth aspect of the present invention, there is provided an image pickup apparatus comprising an image pickup device including a plurality of pixels which are arranged in a row direction and a column direction, a drive unit configured to drive the image pickup device in at least one of a first photographing mode in which image signals are read out from pixels of predetermined rows of the image pickup device, and a second photographing mode in which image signals are read out from readout rows different than the predetermined readout rows in the first photographing mode, an output unit including a first output path and a second output path for separately outputting the image signals read out from the image pickup device in the first photographing mode and the image signals read out from the image pickup device in the second photographing mode, and a control unit configured, when a state in which image signals in the first photographing mode output from the first output path are used for image display on a display unit and/or recording in a memory unit, is changed to a state in which image signals to be used for the image display and/or the recording are from the image signals in the second photographing mode, to start output of the image signals in the second photographing mode from the second output path, and thereafter change an acquisition destination of the image signals to be used for the image display and/or the recording from the first output path to the second output path.

In a sixth aspect of the present invention, there is provided an image pickup apparatus comprising an image pickup device including a plurality of pixels which are arranged in a row direction and a column direction, a drive unit configured to drive the image pickup device in at least one of a first photographing mode in which image signals are read out from pixels of predetermined rows of the image pickup device, and a second photographing mode in which image signals are read out from readout rows different than the predetermined readout rows in the first photographing mode, an output unit including a first output path and a second output path for separately outputting the image signals read out from the image pickup device in the first photographing mode and the image signals read out from the image pickup device in the second photographing mode, a synthesis unit configured to synthesize the image signals output from the first output path and the image signals output from the second output path, and a control unit configured, when a state in which image signals in the first photographing mode output from the first output path are used for image display on a display unit and/or recording in a memory unit, is changed to a state in which image signals to be used for the image display and/or the recording are from synthesized signals of the image signals in the first photographing mode and the image signals in the second photographing mode, to start output of the image signals in the second photographing mode from the second output path, thereafter synthesize the image signals output from the first output path and the image signals output from the second output path by the synthesis unit, and use the synthesized image signals for the image display and/or the recording.

In a seventh aspect of the present invention, there is provided an image pickup apparatus comprising an image pickup device including a plurality of pixels arranged in a two-dimensional manner, an image pickup control unit configured to control at least one of a readout rate and an exposure condition, independently of each other, for each of different areas of the image pickup device, a setting unit configured to set a drive mode for use in reading image signals from the image pickup device, and a display control unit configured, in a case where a plurality of first images based on first image signals continuously read from a first area of the image pickup device are continuously displayed on a display unit, to change images to be displayed on the display unit to second images based on second image signals read out from a second area of the image pickup device different from the first area, according to a change in the drive mode by the setting unit.

In an eighth aspect of the present invention, there is provided an image signal control method for acquiring image signals from an image pickup device including a plurality of pixels which are arranged in a row direction and a column direction via a plurality of output paths including a first output path and a second output path, and displaying an image on a display unit using the acquired image signals, wherein in a case where, from a state in which image signals, which are used for image display, are output from the first output path by driving the image pickup device in a first photographing mode in which image signals are read out from pixels of predetermined readout rows of the image pickup device, a change is made to the image display using image signals output from the first output path by driving the image pickup device in a second photographing mode in which image signals are read out from a larger number of readout rows than the number of the predetermined readout rows in the first photographing mode, the method comprising using image signals output from the first output path in the first photographing mode for the image display, using image signals output from the second output path for a use different from the image display, wherein the image signals are output by driving the image pickup device in a third photographing mode in which readout rows of the image pickup device from which image signals are read out do not overlap with the readout rows in the first photographing mode or with the readout rows in the second photographing mode, temporarily changing an acquisition destination of image signals to be used for the image display from the first output path to the second output path, changing the first photographing mode to the second photographing mode such that the image signals in the second photographing mode are output from the first output path, and changing the acquisition destination of the image signals to be used for the image display from the second output path to the first output path.

In a ninth aspect of the present invention, there is provided an image signal control method for acquiring image signals from an image pickup device including a plurality of pixels which are arranged in a row direction and a column direction via a plurality of output paths including a first output path and a second output path, and displaying an image on a display unit using the acquired image signals, wherein in a case where, from a state in which image signals, which are used for image display, are output from the first output path by driving the image pickup device in a first photographing mode in which image signals are read out from pixels of predetermined readout rows of the image pickup device, a change is made to the image display using image signals output from the first output path by driving the image pickup device in a second photographing mode in which image signals are read out from a larger number of readout rows than the number of the predetermined readout rows in the first photographing mode, the method comprising using image signals output from the first output path in the first photographing mode for the image display, using image signals output from the second output path for a use different from the image display, wherein the image signals are output by driving the image pickup device in a third photographing mode in which readout rows of the image pickup device from which image signals are read out do not overlap with the readout rows in the first photographing mode or with the readout rows in the second photographing mode, changing the drive mode of the image pickup device from the third photographing mode to a fourth photographing mode in which readout rows of the image pickup device from which image signals are read out do not overlap with the readout rows in the first photographing mode or with the readout rows in the second photographing mode, temporarily changing an acquisition destination of image signals to be used for the image display from the first output path to the second output path, changing the first photographing mode to the second photographing mode such that the image signals in the second photographing mode are output from the first output path, changing the acquisition destination of the image signals to be used for the image display from the second output path to the first output path, and changing the fourth photographing mode to the third photographing mode such that the image signals in the third photographing mode are output from the second output path.

In a tenth aspect of the present invention, there is provided an image signal control method for acquiring image signals from an image pickup device including a plurality of pixels which are arranged in a row direction and a column direction via a plurality of output paths including a first output path and a second output path, and displaying an image on a display unit using the acquired image signals, wherein in a case where, from a state in which image signals, which are used for image display, are output from the first output path by driving the image pickup device in a first photographing mode in which image signals are read out from pixels of predetermined readout rows of the image pickup device, a change is made to the image display using image signals output from the second output path by driving the image pickup device in a second photographing mode in which image signals are read out from a larger number of readout rows than the number of the predetermined readout rows in the first photographing mode, and from a state in which image signals output from the second output path are used for a use different from the image display, wherein the image signals are output by driving the image pickup device in a third photographing mode in which readout rows of the image pickup device from which image signals are read out do not overlap with the readout rows in the first photographing mode or with the readout rows in the second photographing mode, a change is made such that image signals in the third photographing mode are output from the first output path, the method comprising using the image signals, which are output from the first output path, in the first photographing mode for the image display, using the image signals, which are output from the second output path, in the third photographing mode for a use different from the image display, temporarily stopping processing for the use different from the image display, which uses the image signals in the third photographing mode, starting driving of the image pickup device in the second photographing mode such that the image signals in the second photographing mode are output from the second output path, changing an acquisition destination of image signals to be used for the image display from the first output path to the second output path, changing the first photographing mode to the third photographing mode such that the image signals in the third photographing mode are output from the first output path, and restarting the processing for the use different from the image display, which uses the image signals in the third photographing mode.

In an eleventh aspect of the present invention, there is provided an image signal control method for an image pickup apparatus capable of acquiring image signals from an image pickup device via a first output path and a second output path, comprising using image signals output from the first output path for live view on a display unit, using image signals output from the second output path for a use different from the live view, changing a mode of driving the image pickup device such that image signals output from the second output path can be used for the live view display at a first definition level, changing the acquisition destination of image signals to be used for the live view from the first output path to the second output path, changing the mode of driving the image pickup device such that image signals which can be used for the live view at a second definition level different from the first definition level are output from the first output path, changing the acquisition destination of the image signals to be used for the live view from the second output path to the first output path, and changing the mode of driving the image pickup device such that image signals which can be used for the use different from the live view are output from the second output path, or no image signal are output from the second output path.

In a twelfth aspect of the present invention, there is provided an image signal control method for acquiring image signals from an image pickup device including a plurality of pixels which are arranged in a row direction and a column direction via a plurality of output paths including a first output path and a second output path, and performing image display on a display unit using the acquired image signals and/or recording of the acquired image signals in a memory unit, wherein in a case where, from a state in which image signals output from the first output path in a first photographing mode in which images signals read from pixels of predetermined readout rows of the image pickup device are used for the image display and/or the recording, image signals to be used for the image display and/or the recording are changed to image signals in a second photographing mode in which image signals are read out from readout rows different from the predetermined readout rows in the first photographing mode, the method comprising using the image signals, which are output from the first output path, in the first photographing mode for the image display and/or the recording, starting output of the image signals in the second photographing mode from the second output path, and changing an acquisition destination of the image signals to be used for the image display and/or the recording from the first output path to the second output path.

In a thirteenth aspect of the present invention, there is provided an image signal control method for acquiring image signals from an image pickup device including a plurality of pixels which are arranged in a row direction and a column direction via a plurality of output paths including a first output path and a second output path, and performing image display on a display unit using the acquired image signals and/or recording of the acquired image signals in a memory unit, wherein in a case where, from a state in which image signals output from the first output path in a first photographing mode in which images signals read from pixels of predetermined readout rows of the image pickup device are used for the image display and/or the recording, image signals to be used for the image display and/or the recording are changed to synthesized signals of image signals in a second photographing mode in which image signals are read out from readout rows different from the predetermined readout rows in the first photographing mode and the image signals in the first photographing mode, the method comprising using image signals, which are output from the first output path, in the first photographing mode for the image display and/or the recording, starting output of the image signals in the second photographing mode from the second output path, synthesizing the image signals output from the first output path and the image signals output from the second output path, and performing the image display and/or the recording using the synthesized image signals.

In a fourteenth aspect of the present invention, there is provided an image signal control method for controlling at least one of a readout rate and an exposure condition, independently of each other, for each of different areas of an image pickup device including a plurality of pixels arranged in a two-dimensional manner, the method comprising changing, in a case where a plurality of first images based on first image signals continuously read from a first area of the image pickup device are continuously displaced on a display unit, images to be displayed on the display unit to second images based on second image signals read out from a second area of the image pickup device different from the first area, according to a change in a drive mode for use in reading image signals from the image pickup device.

According to the first to fourth seventh to eleventh, and fourteenth aspects of the present invention, image signals are acquired from the image pickup device through the first output path and the second output path, the image signals output from the first output path are used for the live view display (image display), and the image signals output from the second output path are used for a use other than the live view display. From this state, first, the drive mode of the image pickup device is changed such that the image signals output from the second output path can be used for the live view display, and the acquisition destination of the image signals for the live view display is changed from the first output path to the second output path. Next, the drive mode of the image pickup device is changed such that the image signals for the live view display, different in definition level, are output from the first output path, and the acquisition destination of the image signal for the live view display is changed from the second output path to the first output path.

This makes it possible to change the photographing drive mode for the live view display without causing freezing of the live view display, which reduces stress of the user in using the live view display to thereby make it possible to improve user-friendliness.

According to the fifth, sixth, twelfth, and thirteenth aspects of the present invention, in the image pickup apparatus equipped with the image pickup device capable of acquiring different image signals via the first output path and the second output path, when the photographing drive mode is changed, the acquisition destination of the image signal is changed between the first output path and the second output path. By this configuration, even when the photographing drive mode of the live view display or the moving image recording is changed, it is possible to prevent the live view display or the moving image recording from freezing, and image quality from being deteriorated.

Further features of the present invention will become apparent from the following description of exemplary embodiments (with reference to the attached drawings). Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIG. 4 is a diagram useful in schematically explaining readout rows of signals read out from the image pickup device, shown in FIGS. 3A and 3B, during the live view display in the digital camera shown in FIG. 1.

FIG. 15 is a diagram useful in schematically explaining readout rows of signals read out from the image pickup device in changing a view angle (angle of view), in the digital camera as an image pickup apparatus according to a third embodiment of the present invention.

DESCRIPTION OF THE EMBODIMENTS

The present invention will now be described in detail below with reference to the accompanying drawings showing embodiments thereof. Here, a compact-type digital camera (hereinafter referred to as the "digital camera") is taken as an example of an image pickup apparatus according to the present invention, but the present invention is not limited to this.

Figure 1:
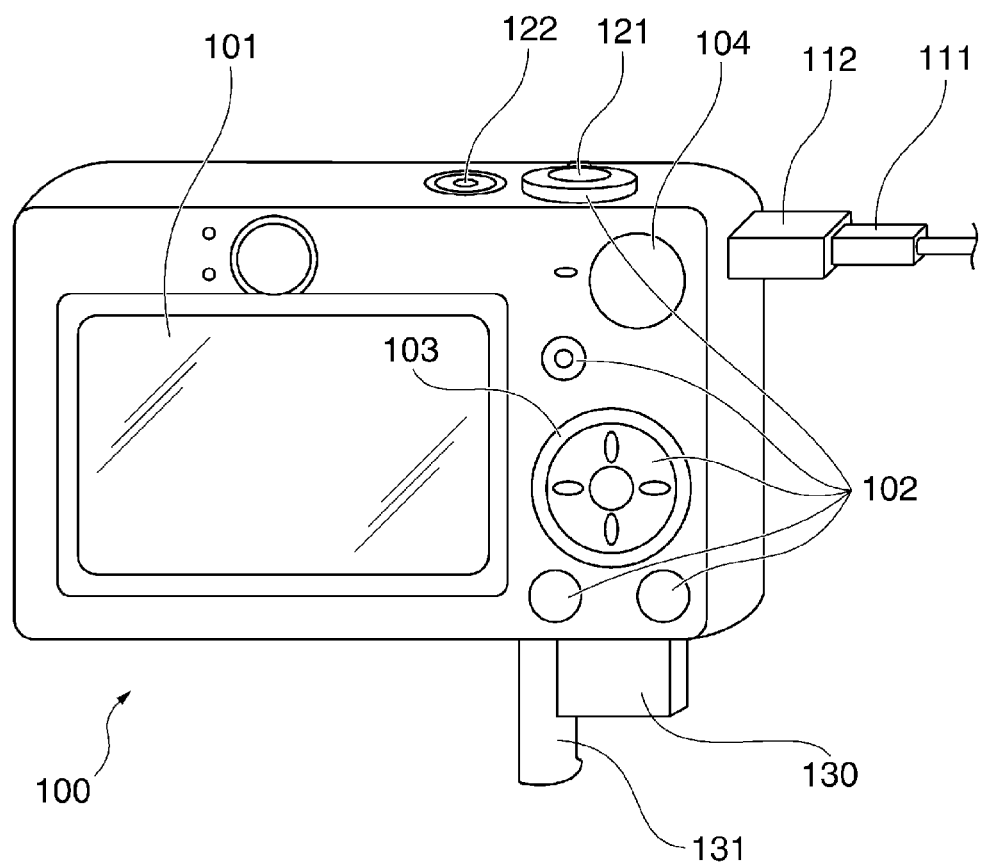
FIG. 1 is a perspective view of the appearance of a digital camera as an image pickup apparatus according to a first embodiment of the present invention, as viewed from the rear.

FIG. 1 is a perspective view of the appearance of the digital camera, denoted by reference numeral 100, according to a first embodiment of the present invention, as viewed from the rear.

The digital camera 100 has a rear surface provided with a display section 101 that displays an image and various information. The display section 101 is a liquid crystal display or an organic EL display, for example, and may be configured to function as a console section which is provided with a touch panel so as to serve as an input function. Further, the rear surface of the digital camera 100 is provided with an operation section 102 formed by operation members, such as various switches and buttons for receiving various operations from a user, a mode changing switch 104 for changing a photographing mode for an object, and a controller wheel 103 which can be rotatably operated. Some of the operation members of the operation section 102 are provided on a top surface of the digital camera 100 as well, and for example, a zoom lever that performs a zooming operation is provided on the top surface of the digital camera 100. The functions and the like of the operation section 102, the controller wheel 103, the mode changing switch 104 will be described hereinafter with reference to FIG. 2.

The top surface of the digital camera 100 is provided with a shutter button 121 for giving a photographing instruction, and a power switch 122 for switching between power-on and power-off of the digital camera 100. The function of the shutter button 121 will be described in detail hereinafter with reference to FIG. 2.

The digital camera 100 has a side surface to which an external apparatus can be connected via a connection cable 111 and a connector 112. The digital camera 100 is capable of outputting image data (still image data and moving image data) to the external apparatus via the connection cable 111 and the connector 112.

The digital camera 100 has a bottom surface provided with a storage medium slot (not shown) which can be opened and closed by a cover 131, and a storage medium 130, such as a memory card, can be inserted in and removed from the storage medium slot. The storage medium 130 accommodated in the storage medium slot can communicate with a controller (a system controller 210, described hereinafter with reference to FIG. 2) of the digital camera 100. Note that the storage medium 130 is not limited to e.g. a memory card which can be inserted in and removed from the storage medium slot, but may be an optical disk, such as a DVD-RW disk, and a magnetic disk, such as a hard disk, and further, may be incorporated in a camera main body.

Figure 2:
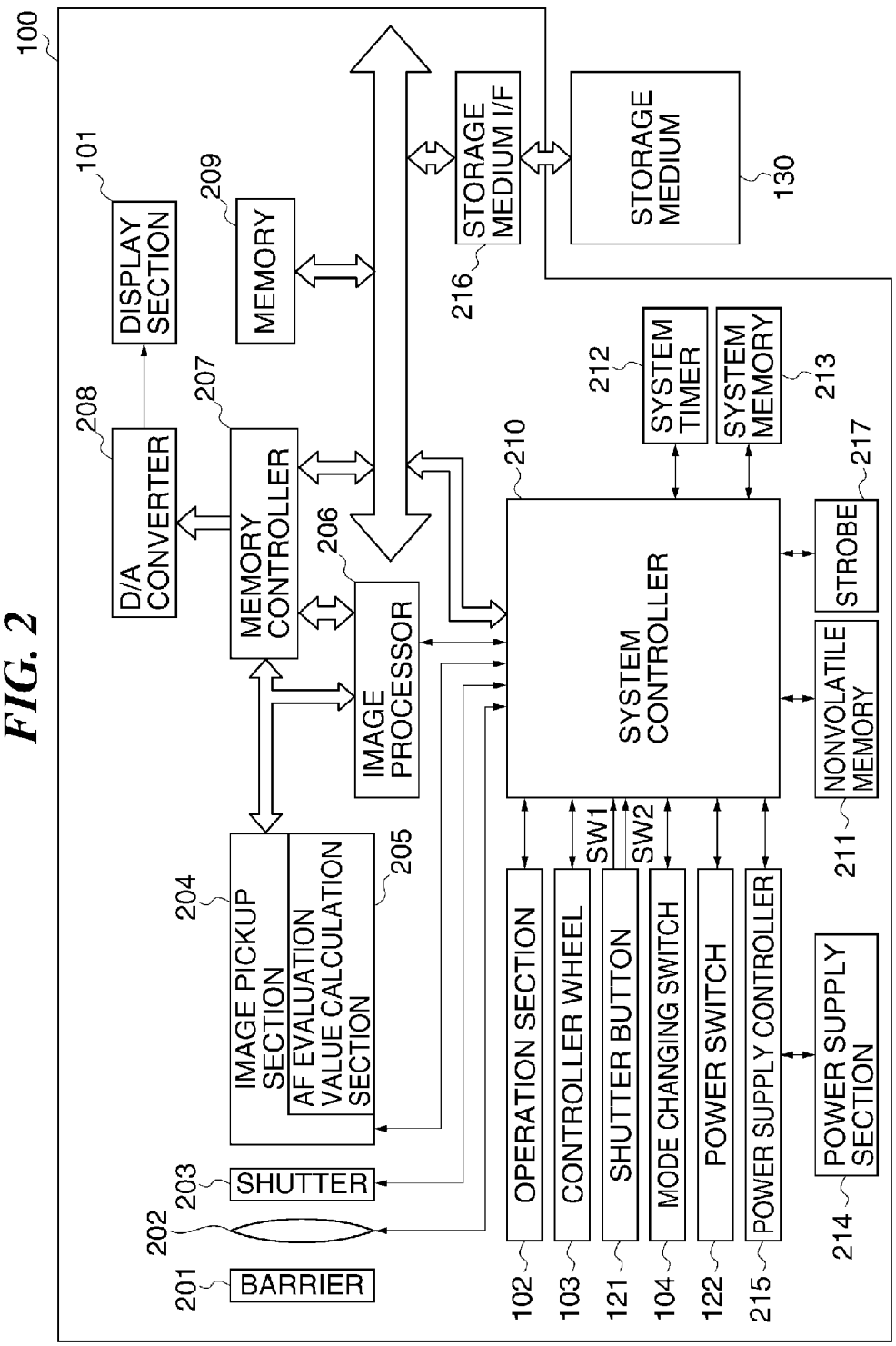
FIG. 2 is a block diagram of the hardware configuration of the digital camera shown in FIG. 1.

FIG. 2 is a block diagram of the hardware configuration of the digital camera 100. The digital camera 100 includes a barrier 201, a photographic lens 202 and a shutter 203 which form an image pickup optical system, an image pickup section 204, an AF evaluation value calculation section 205, and a strobe 217.

The barrier 201 covers the image pickup optical system to thereby prevent the image pickup optical system from being soiled and damaged. The photographic lens 202 is formed by a lens group including a zoom lens and a focus lens. The shutter 203 has an iris function and adjusts an exposure amount. The image pickup section 204 includes an image pickup device that converts an optical image to an electric signal (analog signal). More specifically, the image pickup device is implemented e.g. by a CCD sensor or a CMOS sensor. Further, the image pickup section 204 has an analog-to-digital conversion function, and converts an analog electric signal (analog signal) output from the image pickup device to a digital signal (digital image data).

The AF evaluation value calculation section 205 calculates an AF evaluation value based on contrast information and the like obtained from the digital signal generated by the image pickup section 204, and outputs the obtained AF evaluation value to the system controller 210, described hereinafter, via the image pickup section 204. By causing the strobe 217 to emit light, it is possible to compensate for the insufficient illumination in photographing a low-light scene and a backlit scene.

The digital camera 100 further includes an image processor 206, a memory controller 207, a digital-to-analog converter 208, a memory 209, the system controller 210, a nonvolatile memory 211, a system timer 212, a system memory 213, and the display section 101.

The image processor 206 and the memory controller 207 receive a digital signal generated by analog-to-digital conversion performed by the image pickup section 204. The image processor 206 performs resizing, such as predetermined pixel interpolation and reduction, and signal processing, such as color conversion, on data (digital image data) received from the image pickup section 204 or data received from the memory controller 207. Further, the image processor 206 performs predetermined calculation processing using image data of a photographed image, and the system controller 210 performs exposure control and focus control using the calculation result generated by the image processor 206. For example, the system controller 210 performs AF (automatic focusing) processing by the TTL (through the lens) method, AE (automatic exposure) processing, light control processing, and AWB (automatic white balance) processing. Note that when the image processor 206 performs AF processing, an output from the AF evaluation value calculation section 205 included in the image pickup section 204 is sometimes used.

The digital signal (digital image data) output from the image pickup section 204 is written into the memory 209 via the image processor 206 and the memory controller 207, or via the memory controller 207. The memory 209 stores not only the digital signal, but also image data acquired by the image pickup section 204 and subjected to analog-to-digital conversion, and image data to be displayed on the display section 101. The memory 209 has a sufficient storage capacity to store a predetermined number of still images, a predetermined duration of a moving image and voice data. Further, the memory 209 also serves as an image display memory (video memory).

The digital data for image display, stored in the memory 209, is transmitted to the digital-to-analog converter 208. The digital-to-analog converter 208 converts the received digital data to an analog signal, and supplies the analog signal to the display section 101, whereby an image is displayed on the display section 101. The display section 101, as described above, is a display device, such as a liquid crystal display, and displays an image based on the analog signal output from the digital-to-analog converter 208. Note that the digital signal, which is converted from the analog signal output from the image pickup device by the image pickup section 204 and is accumulated in the memory 209, can be converted to an analog signal by the digital-to-analog converter 208 and be sequentially transferred to the display section 101 for display, whereby it is possible to realize an electronic viewfinder function. That is, this makes it possible to perform through image display.

The nonvolatile memory 211 is an electrically erasable and storable memory, and for example, is an EEPROM represented by a flash memory. The nonvolatile memory 211 stores programs executed by the system controller 210, constants used for operations, and so forth. Note that the programs mentioned here are programs for executing processes described hereinafter with reference to drawings.

The system controller 210 controls the overall operation of the digital camera 100 by executing the various programs stored in the nonvolatile memory 211, and performs various processes, described hereinafter by way of example. Further, the system controller 210 performs display control by controlling the memory 209, the digital-to-analog converter 208, the display section 101, and so forth. The programs, constants and variables for operation, and so forth, read out from the nonvolatile memory 211 by the system controller 210, are loaded into the system memory 213. A RAM is used for the system memory 213. The system timer 212 counts time for various controls using a built-in clock.

The operation section 102, the controller wheel 103, the shutter button 121, the mode changing switch 104, and the power switch 122, appearing in FIG. 2, are the same as those described with reference to FIG. 1.

Some of the various operation members forming the operation section 102 are used e.g. for selecting various function icons displayed on the display section 101, and when a predetermined function icon is selected, a predetermined function is accordingly allocated for each scene. That is, the operation members of the operation section 102 are used as various function buttons.

The controller wheel 103 which is a rotatably operable operation member is used in combination with a four-direction button e.g. for indicating a selected item. When the controller wheel 103 is rotatably operated, an electric pulse signal is generated according to an operated amount (e.g. a rotation angle and the number of rotations). The system controller 210 analyzes the generated pulse signal to thereby control the sections of the digital camera 100.

Note that the controller wheel 103 may be of any type, such as a member which rotates itself, and a member which does not rotate itself but detects a rotation operation by a touch sensor, insofar as it is an operation member which can detect a rotation operation.

As mentioned hereinabove with reference to FIG. 1, the operation section 102 includes the zoom lever provided on the top surface of the digital camera 100. The zoom lever is arranged in a manner surrounding the shutter button 121, and is rotatable within a predetermined angle range. The operation for rotating the zoom lever is used not only for an optical zooming operation of the photographic lens 202, but also for an operation for changing, in a case where a zooming operation is performed beyond the limit of the optical zooming operation, the zooming operation to an electronic zooming operation so as to further change a zoom magnification of the electronic zoom.

The shutter button 121 includes a first switch SW1 and a second switch SW2. The first switch SW1 is turned on when the shutter button 121 is half pressed during operation thereof, whereby a signal for instructing a photographing preparation is transmitted to the system controller 210. Upon receipt of the signal, which indicates the turn-on of the first switch SW1, the system controller 210 starts operations for AF processing, AE processing, AWB processing, light control processing, and so forth. The second switch SW2 is turned on when the shutter button 121 is fully pressed, i.e. when the operation of the shutter button 121 is completed, whereby a signal for instruction a start of photographing is transmitted to the system controller 210. Upon receipt of the signal, which indicates the turn-on of the second switch SW2, the system controller 210 performs a series of photographing operations from reading of a signal from the image pickup section 204 to writing of image data in the storage medium 130.

The mode changing switch 104 is a switch for switching the operation mode of the digital camera 100 between various modes, such as a still image-photographing mode, a moving image-photographing mode, and a reproduction mode. Examples of the still image-photographing mode include an automatic photographing mode, an automatic scene determination mode, a manual mode, various scene modes which are settings set for respective photographic scene types, a program AE mode, a custom mode, and so forth. By operating the mode changing switch 104, it is possible to directly change the mode to one of these modes included in the still image-photographing mode. However, this is not limitative, but for example, after changing the mode to the still image-photographing mode by operating the mode changing switch 104, the mode may be changed to one of the above-mentioned modes included in the still image-photographing mode using another operation member. Similarly, the moving image-photographing mode may include a plurality of modes.

The digital camera 100 includes a power supply section 214 and a power supply controller 215. The power supply section 214 is implemented by a primary battery, such as an alkaline battery and a lithium battery, a secondary battery, such as a NiCd battery, a NiMH battery, and a Li battery, or an AC adapter, for supplying electric power to the power supply controller 215. The power supply controller 215 is comprised of a battery detection circuit, a DC-to-DC converter, and a switching circuit for switching between blocks to be energized, neither of which is shown. The power supply controller 215 detects whether or not a battery is mounted in the power supply section 214, a type of the battery, and a remaining amount of the battery, and controls the DC-to-DC converter based on the detection result and an instruction from the system controller 210 to supply required voltage to the sections including the storage medium 130 for a required time period.

The digital camera 100 includes a storage medium interface 216 for enabling communication between the storage medium 130 and the system controller 210 when the storage medium 130 is mounted in the storage medium slot (not shown). The storage medium 130 has been described in detail with reference to FIG. 1, and hence description thereof is omitted.

Figure 3A:
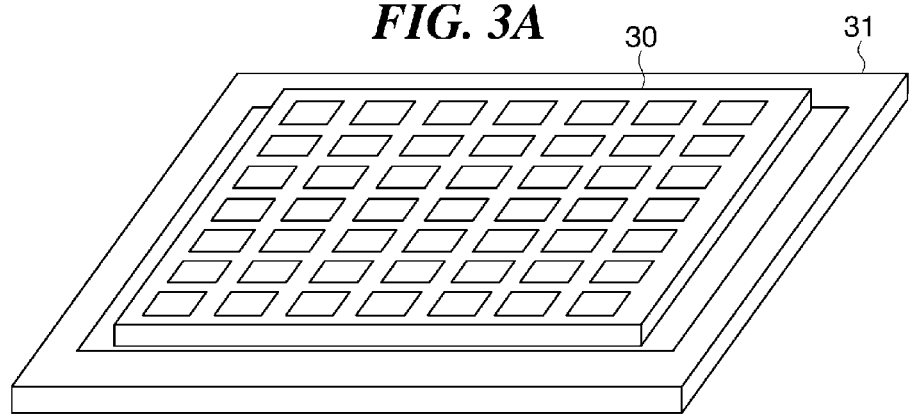
FIG. 3A is a schematic perspective view of an image pickup device included in an image pickup section of the digital camera shown in FIG. 1.
Figure 3B:
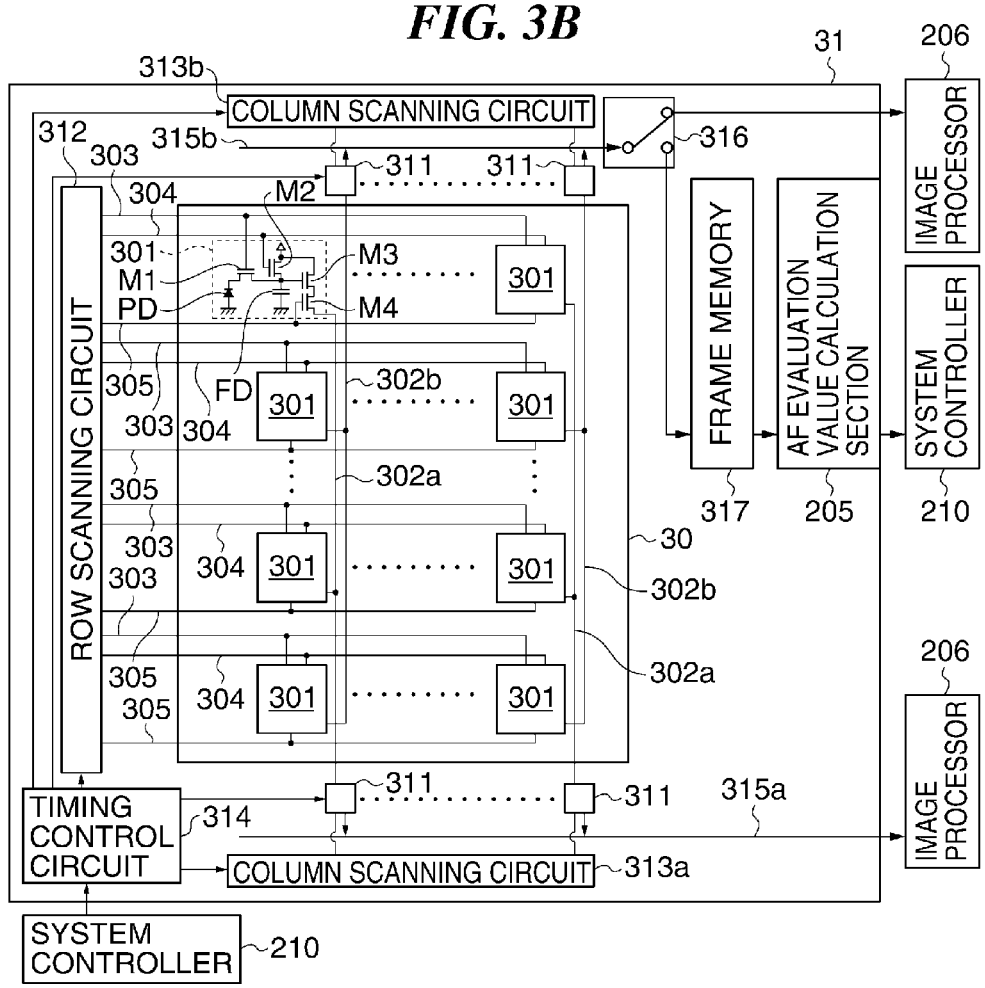
FIG. 3B is a block diagram of the image pickup device shown in FIG. 3A.

FIG. 3A is a schematic perspective view of the image pickup device included in the image pickup section 204, and FIG. 3B is a block diagram of the image pickup device shown in FIG. 3A.

The image pickup device comprises a first chip 30 which is formed with a plurality of pixels 301 and is disposed on a light incident side, and a second chip 31 which is formed with pixel drive circuits, such as column scanning circuits 313a and 313b and a row scanning circuit 312, and the AF evaluation value calculation section 205 (these are referred to as the "peripheral circuits"). The image pickup device is formed by laminating the first chip 30 on the second chip 31. The first chip 30 is formed with the pixels 301, and the second chip 31 is formed with the peripheral circuits, whereby it is possible to separate between a process for manufacturing the peripheral circuits and a process for manufacturing the pixels 301, which makes it possible to realize high-speed processing, downsizing, and high functionality, by making thinner the wires of the peripheral circuits and increasing the density thereof. Further, the image pickup device included in the image pickup section 204 allows control of at least one of a readout rate and an exposure condition for each of different areas of the image pickup device, as will be described hereinafter.

The first chip 30 includes the plurality of pixels 301 which are arranged in a matrix at fixed space intervals in a row direction and a column direction. Further, the first chip 30 includes a transfer signal line 303, a reset signal line 304, and a row selection signal line 305, which are connected to each pixel 301 in the row direction (horizontal direction), and column signal lines 302a and 302b which are connected to respective adjacent pixels 301 in the column direction. In other words, the column signal lines 302a and 302b are connected to different pixels 301 according to respective adjacent readout rows. The pixel connection system will be described hereinafter with reference to FIG. 4.

The second chip 31 includes column ADC blocks 311 to which the column signal lines 302a and 302b are connected, respectively, the row scanning circuit 312 which scans each row, and the column scanning circuits 313a and 313b which scan each column. Further, the second chip 31 includes a timing control circuit 314, horizontal signal lines 315a and 315b, a frame memory 317, the AF evaluation value calculation section 205, and a switch 316.

The timing control circuit 314 performs timing control for each of the row scanning circuit 312, the column scanning circuits 313a and 313b, and the column ADC blocks 311, in response to a control signal from the system controller 210. The horizontal signal lines 315a and 315b each transfer digital signals output from the column ADC blocks 311 according to the timing controlled by the column scanning circuits 313a and 313b. The frame memory 317 temporarily stores AF evaluation value-detecting photographing signals, described hereinafter, which are image signals output from the horizontal signal line 315b. The AF evaluation value calculation section 205 (see FIG. 2) detects an AF evaluation value from the AF evaluation value-detecting photographing signals output from the frame memory 317. The switch 316 switches an output destination of the AF evaluation value-detecting photographing signals output to the horizontal signal line 315b between the frame memory 317 (and hence the AF evaluation value calculation section 205) and the image processor 206.

In the image pickup device, each pixel 301 includes a photo diode PD, a floating diffusion FD, a transfer transistor M1, a reset transistor M2, an amplification transistor M3, and a selection transistor M4. Note that each transistor is an n-channel MOSFET.

The transfer signal line 303, the reset signal line 304, and the row selection signal line 305 are connected to the gates of the transfer transistor M1, the reset transistor M2, and the selection transistor M4, respectively. These signal lines extend in the row direction to simultaneously drive the pixels 301 included in the same row, whereby it is possible to control the operations of a line sequential operation-type rolling shutter and an all row simultaneous operation-type global shutter. The column signal lines 302a and 302b are connected to sources of the selection transistors M4 in adjacent rows, respectively.

The photo diode PD accumulates electric charges generated by photoelectric conversion, and has a P-side grounded and an N-side connected to a source of the transfer transistor M1. When the transfer transistor M1 is turned on, although the electric charges in the photo diode PD are transferred to the floating diffusion FD, the floating diffusion FD has a parasitic capacity, and hence the electric charges are accumulated in the parasitic capacity part.

The amplification transistor M3 has a drain connected to a power supply voltage, and a gate connected to the floating diffusion FD. The amplification transistor M3 converts a voltage of the floating diffusion FD to an electric signal. The selection transistor M4 is used for selecting a pixel from which a signal is to be read out, on a row-by-row basis. The selection transistor M4 has a drain connected to a source of the amplification transistor M3, and a source connected to the column signal line 302a or 302b. When the selection transistor M4 is turned on, a voltage corresponding to the voltage of the floating diffusion FD is output to the column signal line 302a or 302b. The reset transistor M2 has a drain connected to the power supply voltage, and a source connected to the floating diffusion FD. The reset transistor M2 resets the voltage of the floating diffusion FD to the power supply voltage.

Next, selection of the pixels to be connected to the column signal lines 302a and 302b will be described with reference to FIG. 4. FIG. 4 is a diagram useful in schematically explaining readout rows of signals read out from the image pickup device during the live view display of the digital camera 100. In a left part of FIG. 4, there is illustrated the arrangement of the pixels 301 of the image pickup device, using indications of the respective colors (R, G (Gb, Gr), B) of color filters in a Bayer array, which are arranged in a manner corresponding to the pixel array. In a right part of FIG. 4, there are illustrated examples of selected row sets in respective readout modes, described hereafter.

In a state where the live view display is being performed, the live view photographing signals are output to the column signal lines 302a. The live view photographing signals output to the column signal lines 302a are converted from analog to digital in the column ADC blocks 311. The live view photographing signals converted to the digital signals in the column ADC blocks 311 are read out therefrom to the horizontal signal line 315a by the operation of the column scanning circuit 313a. The digitized live view photographing signals read out to the horizontal signal line 315a are output from the image pickup section 204 to the image processor 206.

Here, upon detecting that the AF evaluation value calculated by the image processor 206 based on motion of a main object and the live view photographing signals is small, the system controller 210 outputs an independent AF operation start signal to the image pickup section 204. In the image pickup section 204, when the independent AF operation start signal reaches the second chip 31, the AF evaluation value-detecting photographing signals are output to the column signal lines 302b in a manner separating the readout rows of the pixels 301 so as to enable image pickup for the live view and image pickup for the AF evaluation value detection to be simultaneously performed. Note that the independent AF operation refers to performing the AF operation using photographing signals (Ch2) independent of the live view photographing signals (Ch1) and details thereof will be described hereinafter with reference to FIG. 5.

In the first embodiment, row numbers 1 and 2, appearing in FIG. 4, indicate readout rows for AF photographing, and in an AF photographing drive mode (third photographing mode), the signals are read out from the readout rows indicated by the row numbers 1 and 2. Row numbers 3 and 4, appearing in FIG. 4, indicate readout rows for normal live view photographing, and in a normal live view photographing drive mode (first photographing mode), the signals are read out from the readout rows indicated by the row numbers 3 and 4. In the first embodiment, readout scan of the readout rows of the row numbers 1 and 2 and readout scan of the readout rows of the row numbers 3 and 4 are performed on a sequential row-by-row basis, and a readout scan operation is repeated for every eight rows. Further, the image pickup device is driven to perform both of AF photographing and normal live view photographing by reading out signals in a manner thinning out pixels of the same color in the vertical direction such that three pixels of every four pixels are not used. Therefore, an image signal output in AF evaluation value-detecting photographing has the same image quality as an image signal output in normal live view photographing, and hence it can be used for the live view display as well. Similarly, an image signal output in normal live view photographing can be used for AF evaluation value detection as well.

On the other hand, by operating the operation section 102 or the like, it is possible to perform photographing using a larger number of readout lines, when more importance is placed on the image quality of live view photographing. For example, in a high-definition live view A1 photographing drive mode (second photographing mode) for performing photographing for high-definition live view A1 which is higher in definition level than the normal live view, readout rows indicated by row numbers 3, 4, 7, and 8 are set as photographing rows. Further, it is also possible to perform photographing for a high-definition live view A2 which is the same in definition level as the high-definition live view A1 such that the readout rows of the row numbers 1 and 2 which are AF photographing rows are included in the photographing rows. In a high-definition live view A2 photographing drive mode (fourth photographing mode) for performing photographing for the high-definition live view A2, readout rows indicate by row numbers 1, 2, 5, and 6 are set as photographing rows. Note that the readout rows from which image signals are read out in the AF photographing drive mode and the high-definition live view A2 photographing drive mode are set such that they do not overlap the readout rows from which image signals are read out in the normal live view photographing drive mode and the high-definition live view A1 photographing drive mode.

It is also possible to perform photographing for a high-definition live view B which is higher in definition level, and in a high-definition live view B photographing drive mode (fifth photographing mode), the image pickup device can be driven to perform photographing by thinning out pixels of the same color in the vertical direction such that one pixel of every four pixels is not used (three pixels of the same are used). In this case, readout rows indicated by row numbers 3, 4, 5, 6, 7, and 8 are set as live view photographing rows. By separating the readout rows for AF photographing and those for live view photographing on a selected row set basis as described above, it is possible to acquire image data which is different in electric charge accumulation time (exposure condition) and data size.

The AF evaluation value-detecting photographing signals output to the column signal line 302b are converted from analog to digital in the column ADC block 311. The AF evaluation value-detecting photographing signals converted to the digital signals in the column ADC block 311 are read out therefrom to the horizontal signal line 315b by the operation of the column scanning circuit 313b. The digitized AF evaluation value-detecting photographing signals read out to the horizontal signal line 315b are output to the switch 316.

When the operation mode of the digital camera 100 has been changed to an image pickup device-internal AF evaluation mode in response to a control signal output from the system controller 210, the AF evaluation value-detecting photographing signals, output from the horizontal signal line 351b via the switch 316 and stored in the frame memory 317, are sent to the AF evaluation value calculation section 205. The AF evaluation value calculation section 205 calculates an AF evaluation value based on contrast information of the received AF evaluation value-detecting photographing signals, and outputs only the AF evaluation value signal from the image pickup device of the image pickup section 204 to the system controller 210. On the other hand, when the operation mode of the digital camera 100 has not been changed to the image pickup device-internal AF evaluation mode in response to the control signal output from the system controller 210, the AF evaluation value-detecting photographing signals are output from the horizontal signal line 315b to the image processor 206 via the switch 316.

In the following description, a path (first output path) for outputting photographing signals from the column signal lines 302a to the horizontal signal line 315a is referred to as the channel 1 (hereinafter denoted as the "Ch1"). Further, a path (second output path) for outputting photographing signals from the column signal lines 302b to the horizontal signal line 315b is referred to as the channel 2 (hereinafter denoted as the "Ch2"). In the first embodiment, two modes can be executed which are different in the selected row set used for reading out image signals from the image pickup device, whereby it is possible to output the image signals read out in the respective modes from the Ch1 and the Ch2, separately.

Figure 5:
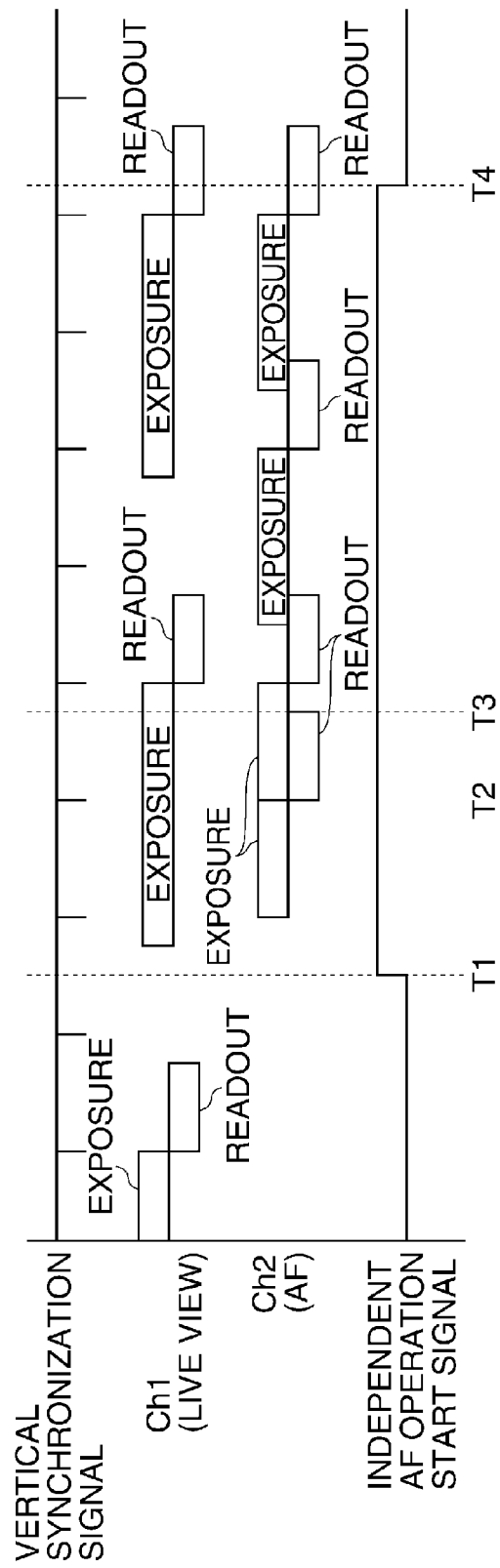
FIG. 5 is a timing diagram showing a relationship between an output signal from Ch1, an output signal from Ch2, and an independent AF operation start signal, in the image pickup section during an independent AF operation of the digital camera shown in FIG. 1.

FIG. 5 is a timing diagram showing a relationship between a signal output from the Ch1, a signal output from the Ch2, and an independent AF operation start signal, in the image pickup section 204 during the independent AF operation. A vertical synchronization signal is output at a timing enabling realization of a high-speed frame rate signal output which can be performed from the Ch1 and the Ch2. In this example, the live view photographing signals are output from the Ch1, and are output by driving the image pickup device at a frame rate of 30 FPS. On the other hand, the vertical synchronization signal is input at 240 Hz. In this case, the live view photographing signals from the Ch1 are controlled such that they are output once for each four vertical synchronization signals by ignoring three vertical synchronization signals. The system controller 210 performs the auto-focus control (AF control) according to a result of calculation by the image processor 206 based on the live view photographing signals input to the image processor 206 for a time period up to a timing T1 in which the live view photographing signals are output from the Ch1.

At the timing T1, it is determined by the system controller 210 that the independent AF operation is required, and the independent AF operation start signal is input. When the independent AF operation start signal is input, the control of output of the AF evaluation value-detecting photographing signals from the Ch2 are started in synchronism with a vertical synchronization signal input next. After exposing the pixels 301, the AF evaluation value-detecting photographing signals is output for the first time at a timing T2. At this time, if the digital camera 100 is in the image pickup device-internal AF evaluation mode, the AF evaluation value calculation section 205 of the image pickup section 204 calculates the AF evaluation value based on the AF evaluation value-detecting photographing signals, and outputs the calculated AF evaluation value to the system controller 210. On the other hand, if the digital camera 100 is not in the image pickup device-internal AF evaluation mode, the AF evaluation value-detecting photographing signals are input to the image processor 206, and the system controller 210 performs the AF control according to a result of calculation by the image processor 206 based on the AF evaluation value-detecting photographing signals. Thus, when the independent AF operation is performed, the live view display and the AF operation are performed using respective photographing signals independent of each other. That is, the independent AF operation is an operation of the AF control performed not using the live view photographing signals output from the Ch1 but using photographing signals output from the Ch2 independently from the photographing signals output from the Ch1.

FIG. 5 indicates that the AF evaluation value-detecting photographing signals are output from the Ch2 at the variable frame rate. More specifically, at a timing T3, the control signal for reducing the frame rate of output of the AF evaluation value-detecting photographing signals from the Ch2 by half is input by the system controller 210. By inputting this control signal, the AF evaluation value-detecting photographing signals is output from the Ch2 once per each two vertical synchronization signals by ignoring one vertical synchronization signal after the next input of the vertical synchronization signal. The maximum exposure time can be changed by changing the frame rate, and hence the system controller 210 performs control for ensuring AF accuracy by changing the frame rate according to a photographing scene. The frame rate (readout rate) of the output from the Ch1 and that of the output from the Ch2 can be controlled independently of each other, and in response to termination of input of the independent AF operation start signal at a timing T4, the output of the AF evaluation value-detecting photographing signals from the Ch2 is stopped.

Here, a description will be given of a problem estimated to be caused by the related technique during photographing using the live view display with reference to FIGS. 6 to 8. In the description given with reference to FIGS. 6 to 8, processes and operations by the same component elements as those of the digital camera 100 will be described using the same reference numerals, as required.

Figure 6:
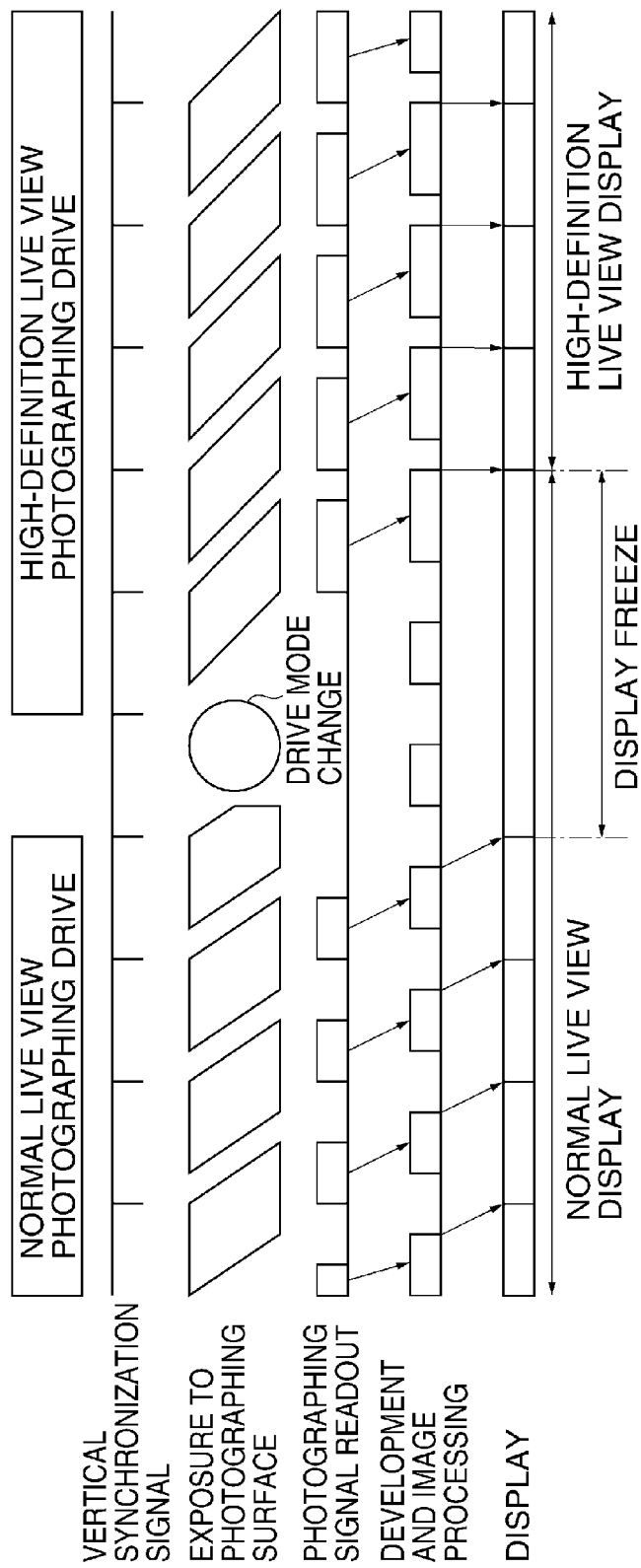
FIG. 6 is a timing diagram of related signals and operations in a case where the photographing drive mode is changed from a normal live view photographing drive mode to a high-definition live view photographing drive mode which is higher in definition level, using a related technique.

FIG. 6 is a timing diagram of related signals and operations in a case where the photographing drive mode is changed from the normal live view photographing drive mode to the high-definition live view photographing drive mode which is higher in definition level, using the related technique. The pixels 301 of the image pickup device are exposed in synchronism with the vertical synchronization signal (exposure to the photographing surface), and the photographing signals of one frame are output from the image pickup section 204. Photographing driving and signal output performed for each row of a plurality of pixels 301 of the image pickup device are controlled in synchronism with a horizontal synchronization signal, not shown in FIG. 6. The row scanning circuit 312 performs reset processing by sequential signal input to the reset signal lines 304 from an uppermost row on the photographing surface to a lowermost row on the same, and after the lapse of the exposure time, the photographing signals are output by being sequentially converted from analog to digital by the column ADC blocks 311. This exposure to the photographing surface is expressed in a parallelogram with time as the horizontal axis in FIG. 6.

The photographing signals read out by the image processor 206 are accumulated in a video memory area of the memory 209 by the signal control performed by the memory controller 207 after being subjected to image processing (including development processing) by the image processor 206. The image display data stored in the memory 209 is converted to an analog signal by the digital-to-analog converter 208, and is supplied to the display section 101, whereby the live view display is performed.

When the normal live view photographing drive mode is changed to the high-definition live view photographing drive mode, frames which become unusable due to this change are generated, and hence as shown in FIG. 6, temporal freezing of the live view display is caused on the display screen of the display section 101. In the high-definition live view photographing drive mode, since the number of readout rows is larger than that of readout rows in the normal live view photographing drive mode, it takes longer time to scan the photographing surface from the uppermost row to the lowermost row. This is expressed in FIG. 6 by a shape of a parallelogram which is increased in an inclination angle.

The above-described change from the normal live view display to the high-definition live view display occurs, for example, in a case where the first switch SW1 of the shutter button 121 is operated (the shutter button 121 is half-pressed). FIG. 7 is a flowchart of a live view mode-changing process performed by the general related technique in a case where an operation (half-press operation) of the first switch SW1 of the shutter button 121 is performed.

When the first switch SW1 is operated in a state where the normal live view is displayed, in a step S701, the system controller 210 performs AE processing. Note that AE processing may be such that it has been terminated before the first switch SW1 is operated. In the following step S702, the system controller 210 changes the photographing drive mode from the normal live view photographing drive mode to the AF photographing drive mode. Note that the AF photographing drive mode may be the same as the normal live view photographing drive mode, and in this case, the drive mode is not required to be changed. However, it is assumed here that in the AF photographing drive mode, the image pickup device is driven at a higher frame rate than in the normal live view photographing drive mode, and hence the drive mode is changed to the AF photographing drive mode in the step S702 to increase the speed of the AF control.

Next, in a step S703, the system controller 210 performs AF processing. Then, in a step S704, the system controller 210 changes the photographing drive mode from the AF photographing drive mode to the high-definition live view photographing drive mode. As a consequence, in an operation standby state of the second switch SW2 of the shutter button 121, the high-definition live view display has been realized.

Figure 7:
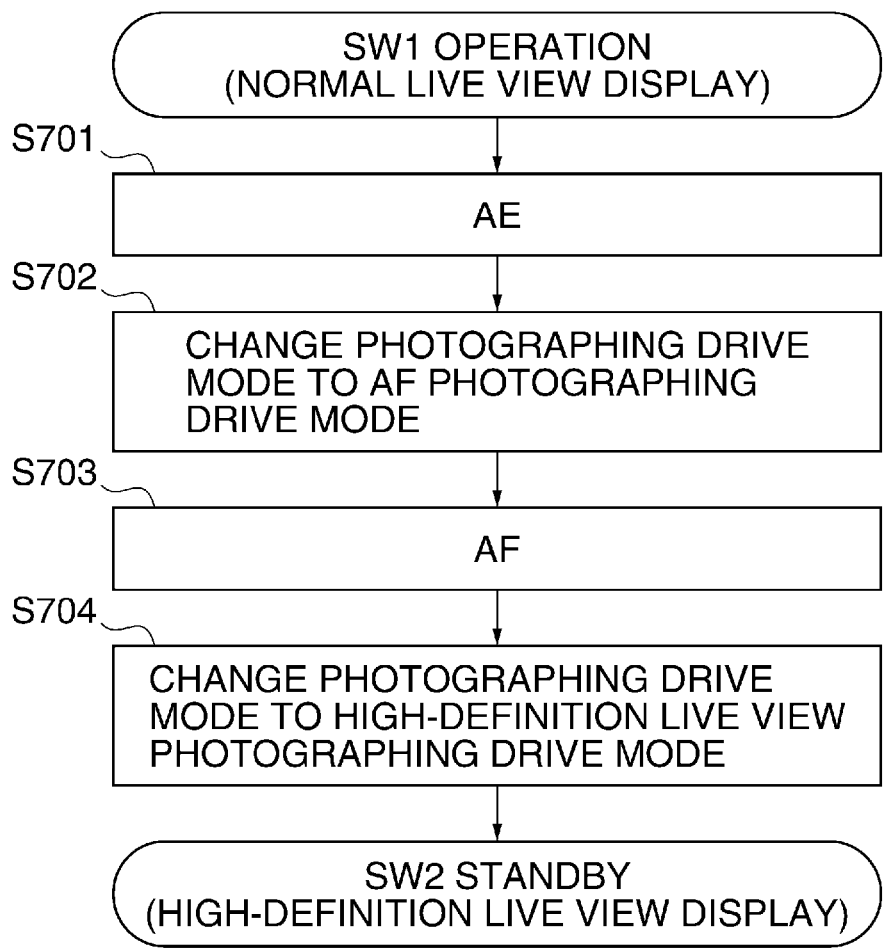
FIG. 7 is a flowchart of a live view mode-changing process performed by the related technique in a case where an operation (half-press operation) of a first switch of a shutter button is performed.
Figure 8:
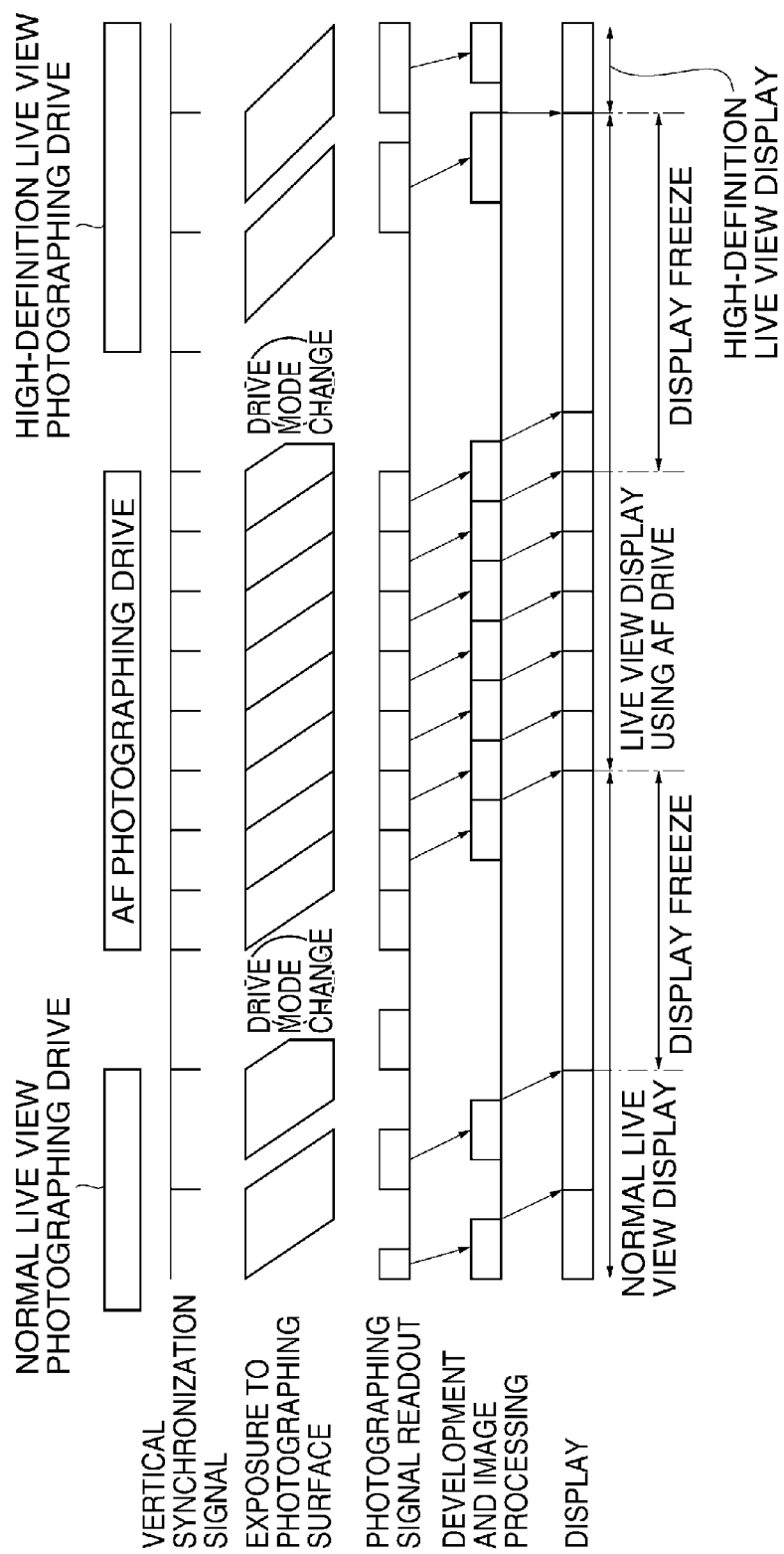
FIG. 8 is a timing diagram showing changes in photographing signals and the like, caused by a change of the photographing drive mode through the live view mode-changing process in FIG. 7 using the related technique.

FIG. 8 is a timing diagram showing changes of the photographing signal and the like, which are caused by a change of the photographing drive mode through the live view mode-changing process in FIG. 7, in the same manner as in FIG. 6. It is clear from FIG. 8 that freezing of the live view display has occurred twice after the first switch SW1 of the shutter button 121 has been operated and before the digital camera 100 enters the operation standby state of the second switch SW2.

As described with reference to FIGS. 6 to 8, the related technique is estimated to suffer from a problem that the live view display freezes due to a change of the drive mode. In contrast, the first embodiment is configured, as described hereafter with reference to FIGS. 9 to 12, such that the drive mode can be changed without causing freezing of the live view display on the display screen. Specifically, on the display screen, an image is displayed which is based on an image signal read out from the Ch2 during a time period in which the image signal cannot be displayed from the Ch1 due to a change in the drive mode.

Figure 9:
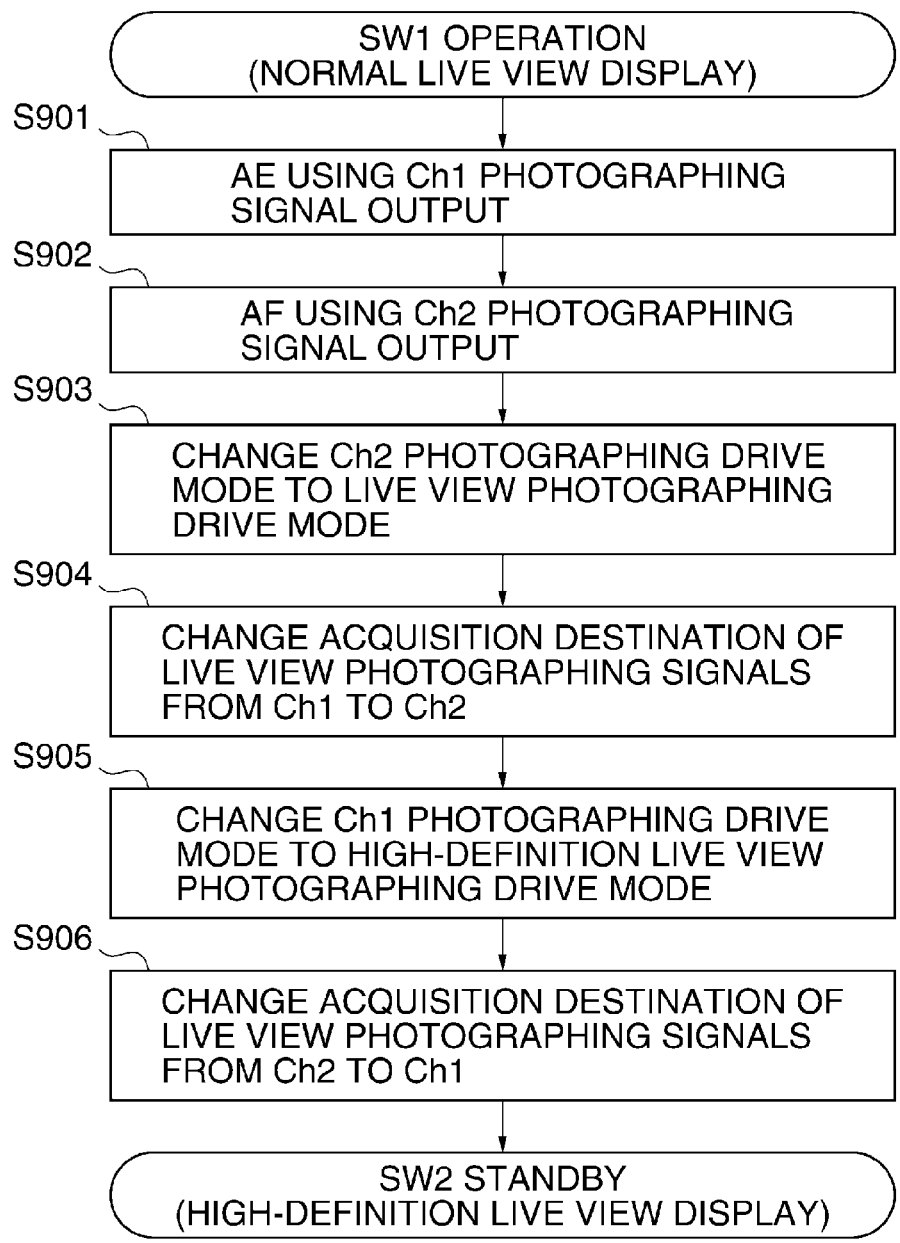
FIG. 9 is a flowchart of an image signal control process performed by the digital camera shown in FIG. 1 when the first switch is operated in a case where the digital camera is performing the independent AF operation but is not in an image pickup device-internal AF evaluation mode.

FIG. 9 is a flowchart of an image signal control process performed by the digital camera 100 shown in FIG. 1 when the first switch SW1 is operated in a case where the digital camera 100 is performing the independent AF operation but is not in the image pickup device-internal AF evaluation mode.

In a step S901, the system controller 210 performs AE processing using normal live view photographing signals (denoted as the "Ch1 photographing signal" in FIG. 9) which are output from the Ch1 and used for the normal live view display. Note that AE processing may be such that it has been terminated before the first switch SW1 is operated. In the following step S902, the system controller 210 performs AF processing using the AF evaluation value-detecting photographing signals (denoted as the "Ch2 photographing signal" in FIG. 9) which are output from the Ch2.

Next, in a step S903, the system controller 210 changes the drive mode from the AF photographing drive mode to the live view photographing drive mode such that in place of the AF evaluation value-detecting photographing signals, the live view photographing signals are output from the Ch2. Note that, in the step S903, instead of being changed to the live view photographing drive mode, the drive mode may be changed to the normal live view photographing drive mode, or to the high-definition live view photographing drive mode (high-definition live view A2). Here, it is assumed that the live view photographing drive mode is changed to the normal live view photographing drive mode.

In the first embodiment, as shown in FIG. 4, the signals are read out from the same number of readout rows in AE photographing and normal live view photographing (readout rows are different), and hence the drive mode is not required to be changed. However, in the first embodiment, the system controller 210 performs control such that the frame rate of the Ch2 after the change becomes equal to that of the Ch1, and exposure conditions (sensitivity and the exposure time) of the photographing signals output from the Ch2 become the same as those of the photographing signals output from the Ch1.

Next, in a step S904, the system controller 210 changes the acquisition destination of the live view photographing signals from the Ch1 to the Ch2. Then, in a step S905, the system controller 210 changes the drive mode such that the output signals from the Ch1 are changed from the normal live view photographing signals to the high-definition live view photographing signals (high-definition live view A1). Further, in a step S906, the system controller 210 changes the acquisition destination of the live view photographing signals from the Ch2 to the Ch1. As a consequence, when the digital camera 100 is in the operation standby state of the second switch SW2, the high-definition live view display has been realized.

Then, if the independent AF operation is continuously required, the system controller 210 changes the drive mode to the AF photographing drive mode (or the AF frame rate) such that the AF evaluation value-detecting photographing signals are output again from the Ch2. On the other hand, if the independent AF operation is not required, the system controller 210 stops outputting of the photographing signals from the Ch2.

Figure 10:
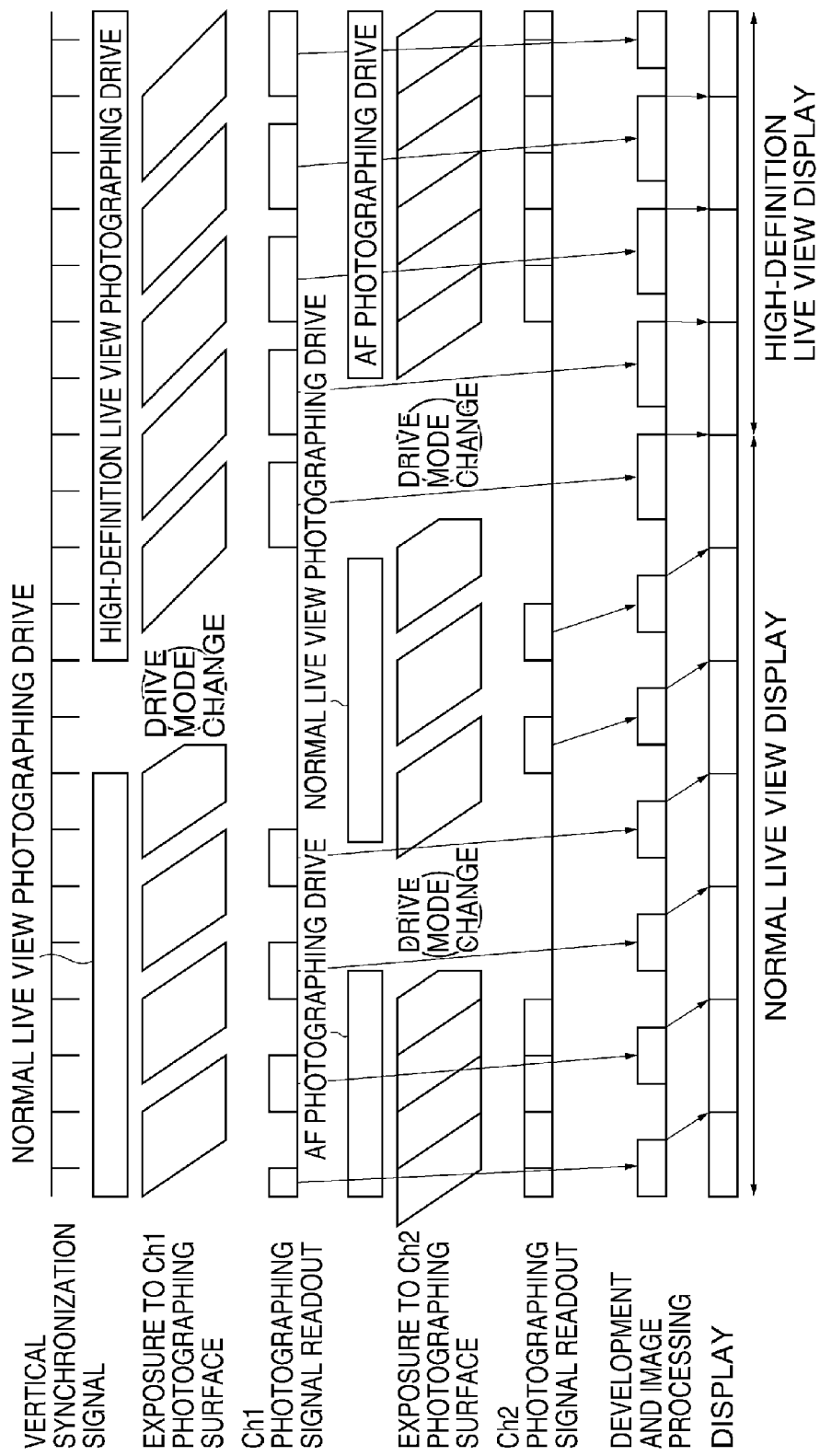
FIG. 10 is a timing diagram showing changes of the photographing signals and so forth, caused by a change of the photographing drive mode through the image signal control process in FIG. 9.

FIG. 10 is a timing diagram showing changes of the photographing signals and so forth, caused by a change of the photographing drive mode through the image signal control process in FIG. 9. It is clear from FIG. 10 that by changing the acquisition destination of the live view photographing signals, the live view display has been changed to the high-definition live view display when the digital camera 100 is in the operation standby state of the second switch SW2, without causing freezing of the live view display on the display screen. Note that a time period from the start of output of image signals in the high-definition live view photographing drive mode to output of the image signals to the display section 101 after performing signal processing thereon for the live view display is set to be equal to a time period required to perform the same processing in the normal live view photographing drive mode. Further, in the first embodiment, in order to make it possible to complete signal processing (including development processing) for high-definition live view display within a display repetition period, a time period from completion of image processing for the normal live view display to display of the normal live view is provided with a margin.

Figure 11:
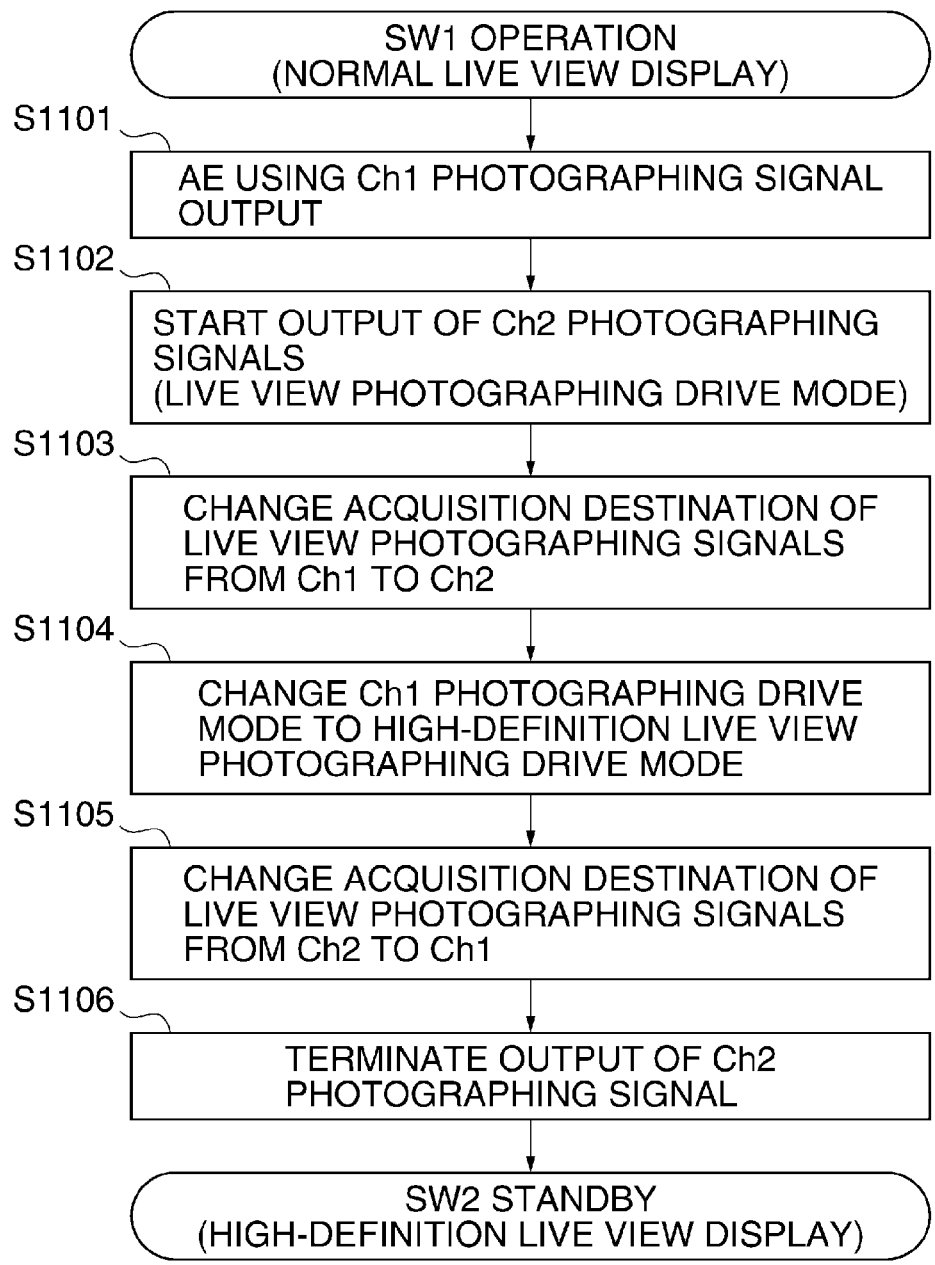
FIG. 11 is a flowchart of an image signal control process performed by the digital camera shown in FIG. 1 when the first switch is operated in a state not during the independent AF operation.

FIG. 11 is a flowchart of an image signal control process performed by the digital camera 100 when the first switch SW1 is operated in a state not during the independent AF operation.

In a step S1101, the system controller 210 performs AE processing using the normal live view photographing signals which are output from the Ch1 and are used for the normal live view display. Note that AE processing may be such that it has been terminated before the first switch SW1 is operated. In the following step S1102, in order to cause the live view photographing signals to start to be output from the Ch2, the system controller 210 sets the photographing drive mode to the live view photographing drive mode.

The live view photographing drive mode set at this time may be the normal live view photographing drive mode, or the high-definition live view photographing drive mode (high-definition live view A2). Although it is assumed here that the normal live view photographing drive mode is set, in the first embodiment, the signals are read out from the same number of readout rows in AE photographing as in normal live view photographing, and hence the drive mode is not required to be changed. However, here, the system controller 210 performs control such that the frame rate of the Ch2 after the change becomes equal to that of the Ch1, and exposure conditions (sensitivity and the exposure time) of the photographing signals output from the Ch2 become the same as those of the photographing signals output from the Ch1.

In a step S1103, the system controller 210 changes the acquisition destination of the live view photographing signals from the Ch1 to the Ch2. In the following step S1104, the system controller 210 changes the drive mode from the normal live view photographing drive mode to the high-definition live view photographing drive mode such that the high-definition live view photographing signals (first high-definition live view A1) are output from the Ch1. Further, in a step S1105, the system controller 210 changes the acquisition destination of the live view photographing signals from the Ch2 to the Ch1 after completion of the change of the drive mode. As a consequence, the high-definition live view display has been realized when the digital camera 100 is in the operation standby state of the second switch SW2. Thereafter, in a step S1106, the system controller 210 stops outputting of the photographing signals from the Ch2.

Figure 12:
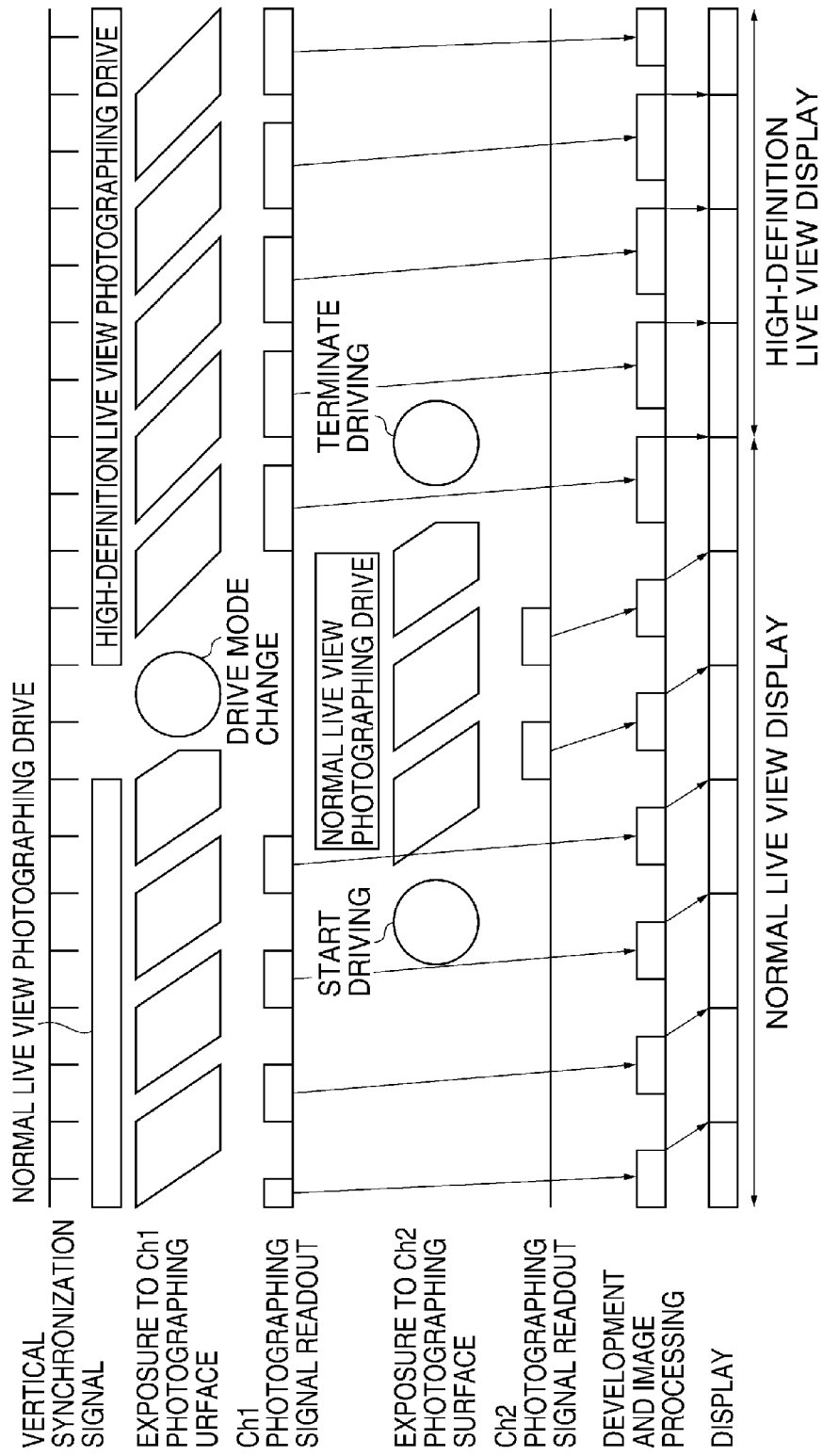
FIG. 12 is a timing diagram showing changes of the photographing signals and the like, caused by a change of the photographing drive mode through the image signal control process in FIG. 11.

FIG. 12 is a timing diagram showing changes of the photographing signals and so forth, caused by a change of the drive mode through the image signal control process in FIG. 11. Also in FIG. 12, the photographing signals output from the Ch1 and the Ch2, respectively, are changed, and the acquisition destination of the live view photographing signals is changed. This makes it possible to cause the high-definition live view display to be performed when the digital camera 100 is in the operation standby state of the second switch SW2, without causing freezing of the live view display on the display screen.

Note that in the first embodiment, in place of the photographing signals described as the photographing signals for the AF control, it is possible to use one of the photographing signals respectively used for the exposure control, the white balance control, the control for detecting a feature point of an object, the control for detecting motion of an object, and so forth. Further, instead of the AF evaluation value alone being caused to be calculated by the AF evaluation value calculation section 205, evaluation values respectively used for the exposure control, the white balance control, the control for detecting a feature point of an object, the control for detecting motion of an object, and so forth can be caused to be calculated by respective evaluation value calculation sections provided therefor.

Next, a second embodiment of the present invention will be described. In the digital camera 100 as the image pickup apparatus according to the first embodiment, the live view photographing signals can be output from the image pickup section 204 via both of the two photographing signal output channels, Ch1 and Ch2, and the AF evaluation value-detecting photographing signals are output only from the Ch2. In contrast, the second embodiment is configured such that output signals from the Ch1 can be used as the AF evaluation value-detecting photographing signals. The digital camera as an image pickup apparatus according to the second embodiment has the same hardware configuration as that of the digital camera 100 in the first embodiment, and hence description thereof is omitted.

Figure 13:
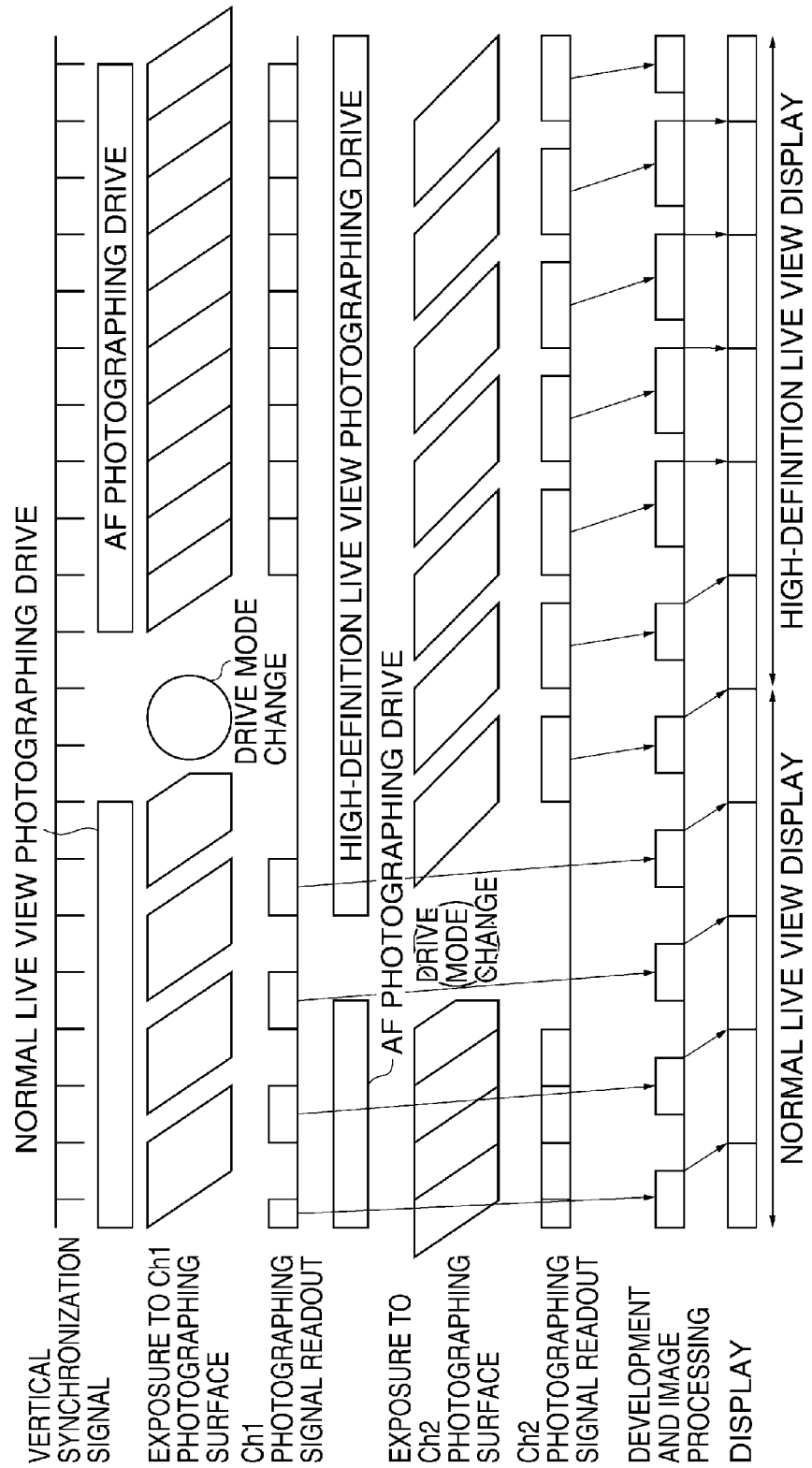
FIG. 13 is a timing diagram of an image signal control process performed by a digital camera as an image pickup apparatus according to a second embodiment of the present invention, in a case where after the acquisition destination of live view photographing signals is changed from Ch1 to Ch2 in the image signal control process in FIG. 9, the output signal from Ch2 continues to be used for the live view.

FIG. 13 is a timing diagram of the image signal control process performed in a case where the acquisition destination of the live view photographing signals is changed from the Ch1 to the Ch2, and then the output signals from the Ch2 continue to be used for the live view in the step S904 in FIG. 9. However, in this embodiment, it is assumed that the photographing drive mode of the Ch2 is changed to the high-definition live view photographing drive mode (high-definition live view A2) in the step S903. As a consequence, the AF processing executed in the step S902 is temporarily stopped.

After the acquisition destination of the live view photographing signals has been changed, if the independent AF operation is required, the drive mode is changed to the AF photographing drive mode such that the AF evaluation value-detecting photographing signals are output from the Ch1. This makes it possible to restart AF processing. On the other hand, if the independent AF operation is not necessary, it is only required to stop output of the photographing signals from the Ch1. FIG. 13 shows an example in which the drive mode has been changed to the AF photographing drive mode. In the second embodiment, the signals are read out from the same number of readout rows in AF photographing as in normal live view photographing, and hence the drive mode is not required to be changed, but the frame rate is changed to the frame rate for AF processing.

Figure 14:
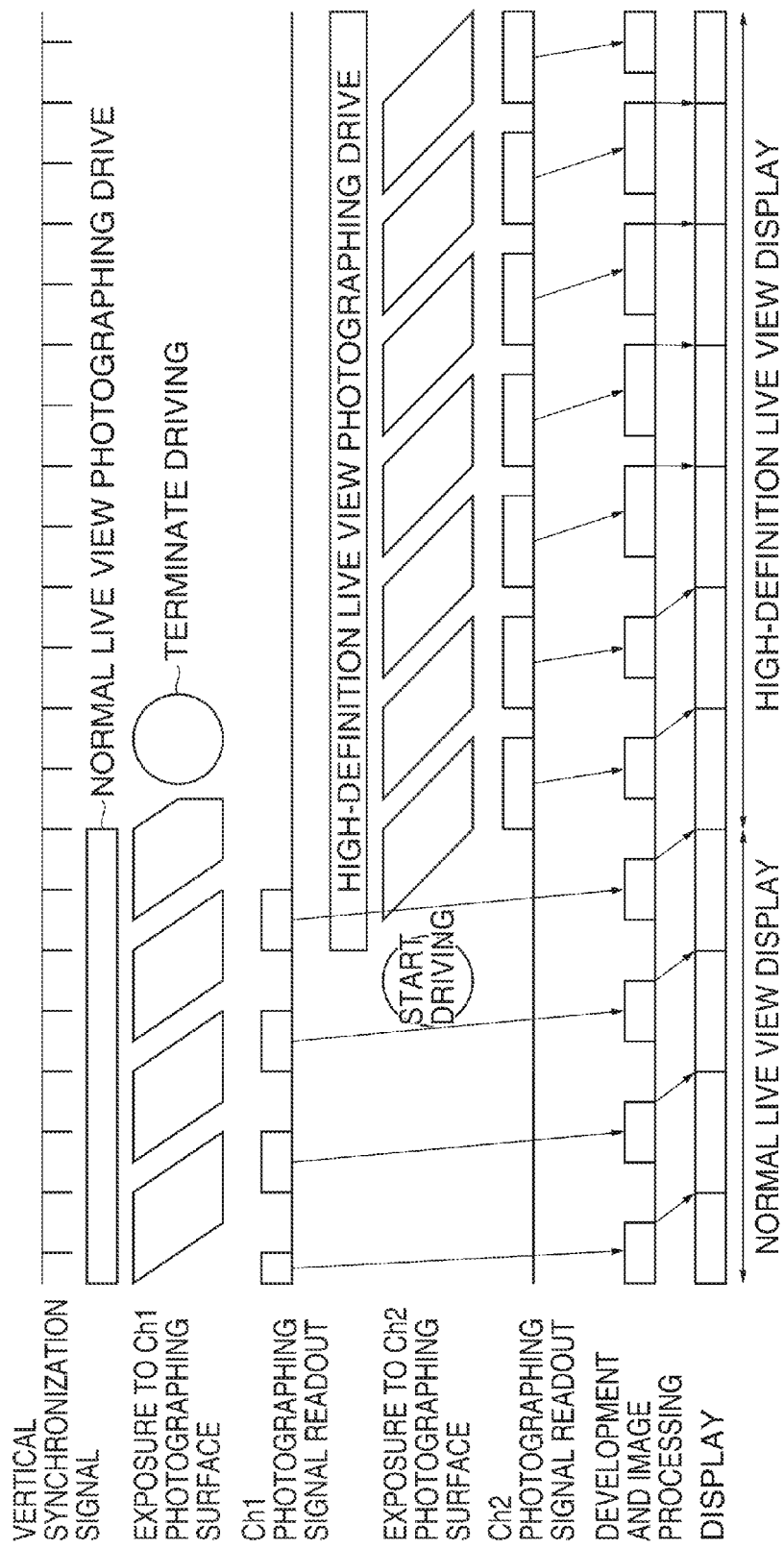
FIG. 14 is a timing diagram of an image signal control process performed by the digital camera as the image pickup apparatus according to the second embodiment, in a case where after changing the acquisition destination of the live view photographing signals from Ch1 to Ch2 in the image signal control process in FIG. 11, the output signal from Ch2 continues to be used for the live view, and output of the photographing signals from the Ch1 is stopped.

FIG. 14 is a timing diagram of the image signal control process performed in a case where after changing the acquisition destination of the live view photographing signals from the Ch1 to the Ch2, the output signals from the Ch2 continue to be used for the live view in the step S1103 of the image signal control process in FIG. 11. However, in this embodiment, in the step S1102, the photographing drive mode of the Ch2 is changed to the high-definition live view photographing drive mode (high-definition live view A2). After the acquisition destination of the live view photographing signals is changed from the Ch1 to the Ch2, output of the photographing signals from the Ch1 is stopped.

Also in the above-described second embodiment, similarly to the first embodiment, it is possible to display the high-definition live view when the digital camera 100 is in the operation standby state of the second switch SW2.

Next, a description will be given of a third embodiment of the present invention. The digital camera as an image pickup apparatus according to the third embodiment has the same hardware configuration as that of the digital camera 100 used in the first embodiment, and hence description thereof is omitted. In the third embodiment, two photographing drive modes are executed which are different in the selected row set used for reading out image signals from the image pickup device, whereby it is possible to cause image signals read out in the respective photographing drive modes to be separately output from the Ch1 and the Ch2. Note that the definition of the Ch1 and Ch2 is the same as that given in the first embodiment.

Next, selection of the pixels to be connected to the column signal lines 302a and 302b will be described with reference to FIG. 15. FIG. 15 is a diagram useful in schematically explaining readout rows (photographing rows) of signals read out from the image pickup device in changing a view angle (angle of view) in the digital camera 100. In a left part of FIG. 15, there is illustrated the arrangement of the pixels 301 of the image pickup device, using indications of the respective colors (R, G (Gb, Gr), B) of color filters in a Bayer array, which are arranged in a manner corresponding to the pixel array. In a right part of FIG. 4, there are illustrated examples of selected rows in respective photographing modes at view angles (angles of view) A, B1, B2, and C, described hereafter.

Row numbers 1 and 2 indicate readout rows in photographing at the view angle A. Row numbers 3, 4, 7, and 8 indicate readout rows in photographing at the view angle B1, and row numbers 1, 2, 5, and 6 indicate readout rows in photographing at the view angle B2. Thus, in the photographing modes at the view angles B1 and B2, a thinning-out ratio of the readout rows is different from that in the photographing mode at the view angle A. In photographing at the view angle B1 and photographing at the view angle B2, although the readout rows are different, the number of readout rows is the same, and as will be described hereinafter with reference to FIGS. 16A to 16C, the view angle at which an image is actually picked up is the same. Row numbers 1 to 8 indicated readout rows in photographing at the view angle C. Therefore, in the photographing mode at the view angle C, a thinning-out ratio of the readout rows is different from those in the photographing modes at the view angles A, B1, and B2. In the third embodiment, the readout operation is sequentially performed on a row-by-row basis, and is repeated for every eight rows.

Figure 16A:
FIGS. 16A to 16C are diagrams showing view angles in respective photographing modes described with reference to FIG. 15.
Figure 16B:
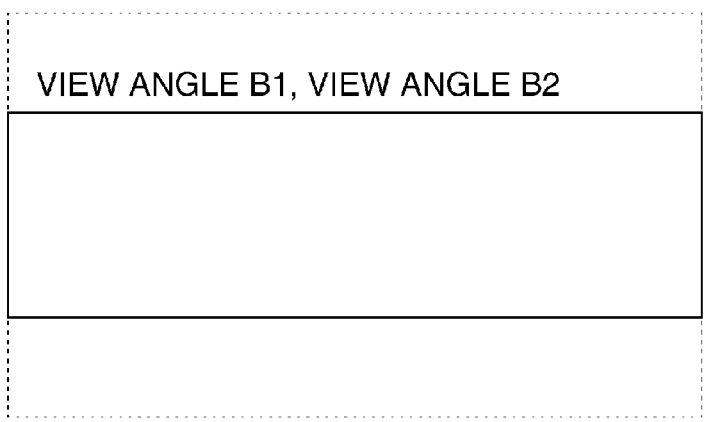
Figure 16C:
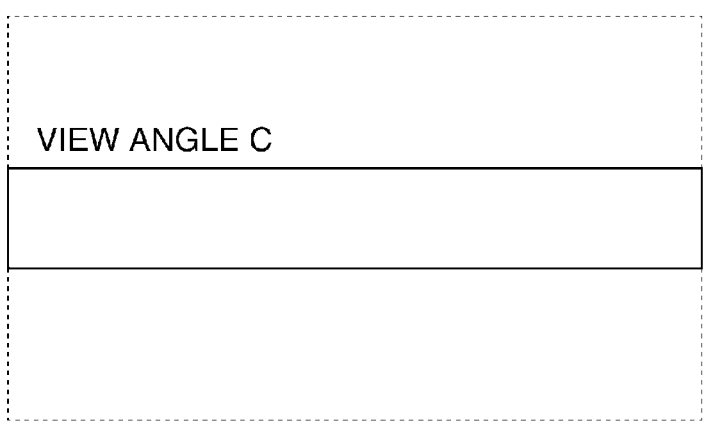

Further, in the third embodiment, in any of photographing at the view angle A, photographing at the view angle B1, photographing at the view angle B2, and photographing at the view angle C, photographing is performed using the same number of readout rows. In other words, the photographing range (view angle) on the photographing surface varies with the number of thinned-out readout rows. FIGS. 16A to 16C are diagrams showing view angles in the respective modes of photographing mentioned with reference to FIG. 15. At the view angle A, photographing is performed using the whole photographing surface by thinning-out readout rows such that two readout rows of every eight readout rows are used. At the view angles B1 and B2, photographing is performed using a half of the photographing surface area by thinning-out readout rows such that four readout rows of every eight readout rows are used. At the view angle C, photographing is performed using a quarter of the photographing surface area without thinning out readout rows. Note that the view angles B1, B2, and C are not necessarily required to cut out a central portion of the photographing surface.

Figure 17:
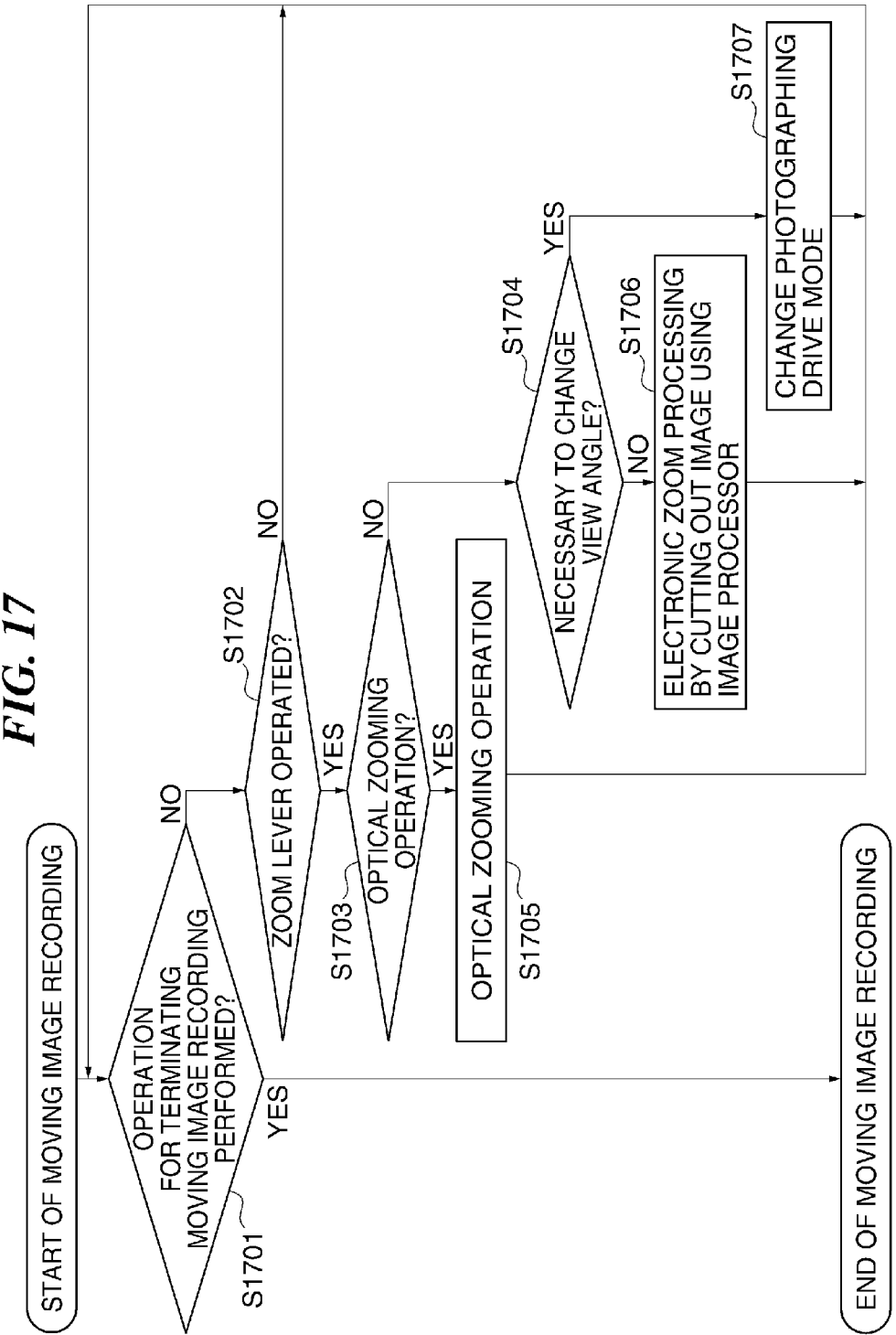
FIG. 17 is a flowchart of an image signal control process performed when a zooming operation is performed during photographing of a moving image using the digital camera.

FIG. 17 is a flowchart of an image signal control process performed when a zooming operation is performed during photographing of a moving image using the digital camera 100. The image signal control process in FIG. 17 is performed under the control of the system controller 210.

First, in a step S1701, the system controller 210 determines whether or not an operation for terminating photographing a moving image has been performed. If the termination operation has been performed (YES to the step S1701), the system controller 210 terminates photographing of the moving image. If the termination operation has not been performed (NO to the step S1701), the system controller 210 proceeds to a step S1702.

In the step S1702, the system controller 210 determines whether or not the zoom lever has been operated. If the zoom lever has not been operated (NO to the step S1702), the system controller 210 returns to the step S1701, whereas if the zoom lever has been operated (YES to the step S1702), the system controller 210 proceeds to a step S1703. In the step S1703, the system controller 210 determines whether or not the operation of the zoom lever performed in the step S1702 is an optical zooming operation. If the operation of the zoom lever is not the optical zooming operation (NO to the step S1703), the system controller 210 proceeds to a step S1704, whereas if the operation of the zoom lever is the optical zooming operation (YES to the step S1703), the system controller 210 proceeds to a step S1705.

In the step S1703, when the zoom lever is operated to further increase the zoom magnification in a state where the zoom lens of the photographic lens 202 has reached an upper limit position of the zoom magnification, or when the zoom lever is operated during the electronic zooming operation, it is determined that the operation of the zoom lever is not the optical zooming operation. Further, the determination in the step S1703 is performed in a case where the digital camera 100 is capable of performing an optical zooming operation by zoom lens control on the photographic lens 202, but it is skipped when the digital camera 100 is incapable of performing an optical zooming operation. In this case, although not shown, the process proceeds from the step S1702 to the step S1704, and the step S1705 is not executed.

In the step S1704, the system controller 210 determines whether or not it is necessary to change the photographing drive mode of the image pickup device so as to change the view angle because of the operation of the zoom lever in the step S1702. In the step S1704, it is necessary to change the control according to the electronic zoom magnification at that time. For this reason, if it is determined based on the electronic zoom magnification and the input operation of the zoom lever that a required change in the view angle is not so large as to bring about a change between one of the view angles A, B1 and B2, and C to an adjacent one of them (NO to the step S1704), the system controller 210 proceeds to a step S1706. On the other hand, if the required change in the view angle is so large as to bring about a change between one of the view angles A, B1 and B2, and C to an adjacent one of them (YES to the step S1704), the system controller 210 proceeds to a step S1707.

In the step S1705, the system controller 210 performs the optical zooming operation. In the step S1706, the system controller 210 performs electronic zoom processing by cutting out and storing a predetermined area of image data in the image processor 206. In the step S1707, the system controller 210 changes the photographing drive mode. More specifically, the system controller 210 changes the drive mode from driving of the image pickup device at the view angle A to driving of the same at the view angle B1 or B2, or from driving of the image pickup device at the view angle B1 or B2 to driving of the same at the view angle C, or from driving of the image pickup device at the view angle C to driving of the same at the view angle B1 or B2, or from driving of the image pickup device at the view angle B1 or B2 to driving of the same at the view angle A. After execution of the steps S1705, S1706, and S1707, the system controller 210 returns to the step S1701.

An example of the step S1707 of the image signal control process in FIG. 17 will be described with reference to FIGS. 18 and 19.

Figure 18:
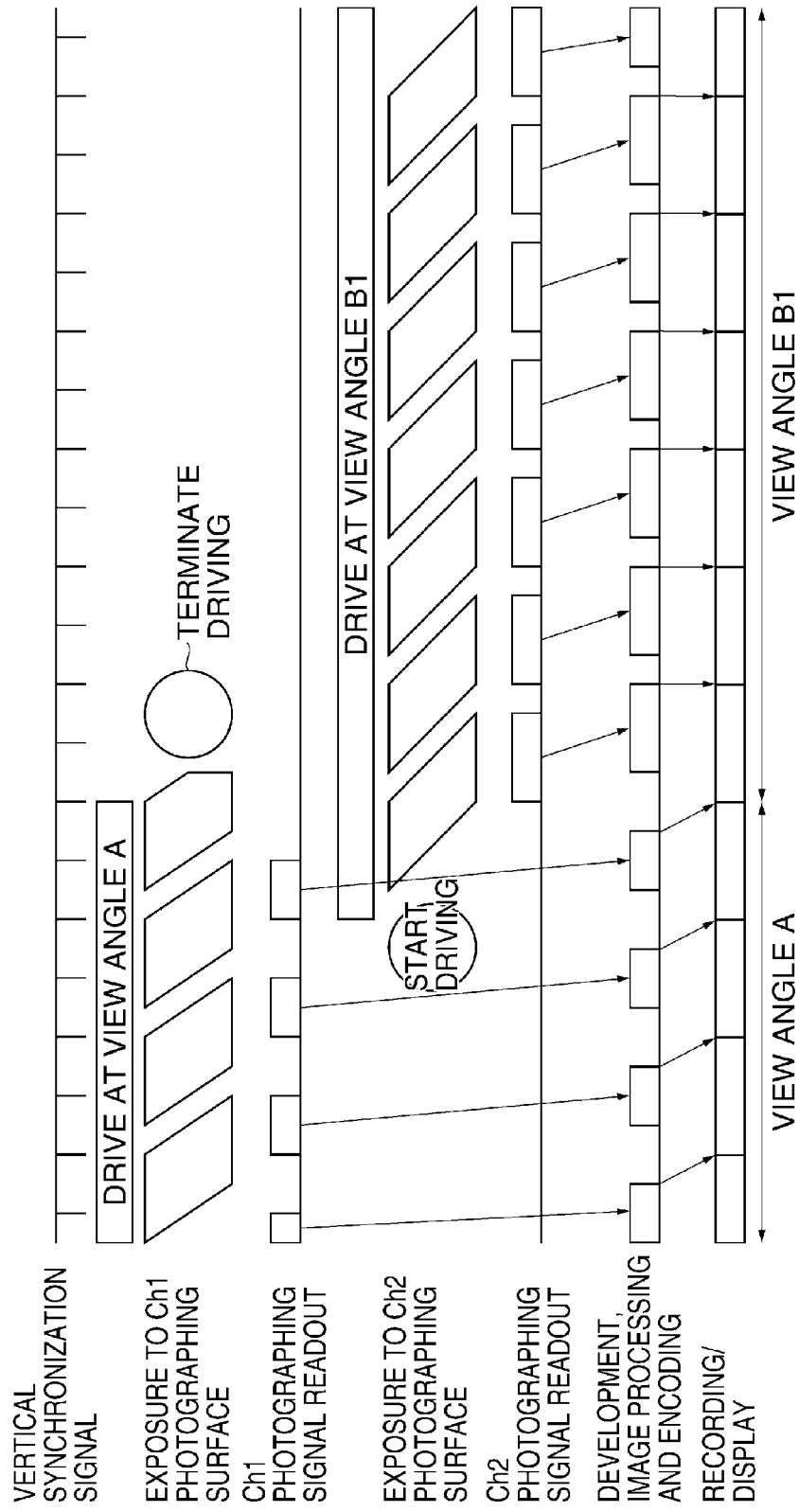
FIG. 18 is a timing diagram schematically showing related signals and operations in a case where the photographing mode of the digital camera is changed from a photographing drive mode at a view angle A in FIG. 15 to a photographing drive mode at a view angle B1, both described with reference to FIG. 15.

FIG. 18 is a timing diagram schematically showing a change from the photographing drive mode at the view angle A to the photographing drive mode at the view angle B1 in the digital camera 100. In the example illustrated in FIG. 18, the photographing drive mode at the view angle A is the first photographing mode, and the photographing drive mode at the view angle B1 is the second photographing mode.

The vertical synchronization signal, appearing in FIG. 18, is output at a timing enabling realization of a high-speed frame rate signal output which can be performed from the Ch1 and the Ch2. The pixels 301 of the image pickup device are exposed in synchronism with the vertical synchronization signal (exposure to the photographing surface), and one frame of image signals of (photographing signals) is output from the image pickup section 204.

First, it is assumed that the image signals in the photographing drive mode at the view angle A are output from the Ch1 by exposing the photographing surface, and the live view display and recording of a moving image are performed using these image signals, but no image signals are output from the Ch2. The photographing driving and signal output performed for each row of a plurality of pixels 301 of the image pickup device are controlled in synchronism with the horizontal synchronization signal (not shown). The row scanning circuit 312 performs reset processing by sequential signal input to the reset signal lines 304 from an uppermost row on the photographing surface to a lowermost row on the same, and after the lapse of the exposure time, the photographing signals are output by being sequentially converted from analog to digital by the column ADC blocks 311. This exposure to the photographing surface is expressed in a parallelogram with time as the horizontal axis in FIG. 18.

The photographing signals output from the Ch1 are accumulated in a video memory area of the memory 209 by the signal control performed by the memory controller 207 after being subjected to image processing (including development processing) by the image processor 206. Further, the image signals output from the Ch1 are subjected to encoding processing by the image processor 206, and are stored in the memory 209. The image data accumulated in the video memory area of the memory 209 is converted to analog signals by the digital-to-analog converter 208, which are supplied to the display section 101, whereby the live view display is performed. Further, the image data stored in the memory 209 is recorded in the storage medium 130, whereby recording of the moving image is performed.

When the live view display and recording of the moving image are changed from those at the view angle A to those at the view angle B1, first, in a state where the image signals at the view angle A are output from the Ch1, driving of the image pickup device in the photographing drive mode at the view angle B1 is started such that the image signals at the view angle B1 are output from the Ch2. Then, when the image signals output from the Ch2 become usable for the live view display and recording of the moving image, the acquisition destination of the image signals for the live view display and recording of the moving image is changed from the Ch1 to the Ch2. This makes it possible to perform the live view display and record the moving image in the storage medium 130 using the image signals output from the Ch2. Note that the signal processing for the live view display and the recording of the image signals output from the Ch2 is the same as the signal processing for the live view display and recording of the image signals output from the Ch1, described hereinbefore.

Note that it is preferable that a time period from output of image signals at the view angle A from the Ch1 to output of the image signals to the display section 101 and the storage medium 130, after being subjected to signal processing for the live view display and recording of the moving image, is equal to a time period from output of image signals at the view angle B1 from the Ch2 to output of the image signals to the display section 101 and the storage medium 130, after being subjected to the signal process for the live view display and recording of the moving image.

According to the above-described control, even when the electronic zoom is performed for changing the drive mode from the photographing drive mode at the view angle A to the photographing drive mode at the view angle B1 during photographing of the moving image, it is possible to prevent discontinuity of the moving image recorded in the storage medium 130 from occurring, and further, it is possible to prevent discontinuity of the live view display from occurring.

Figure 19:
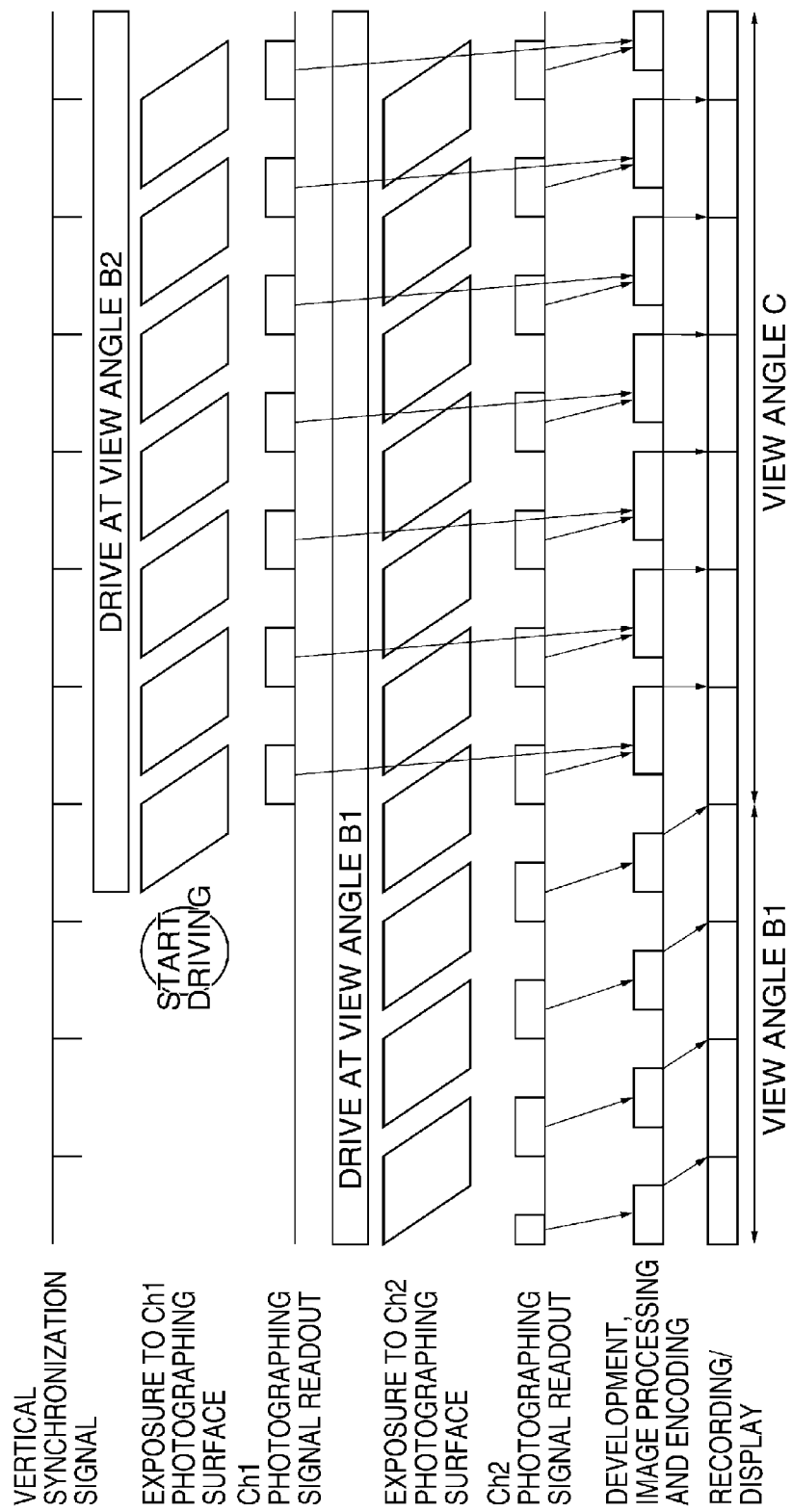
FIG. 19 is a timing diagram schematically showing related signals and operations in a case where the photographing mode of the digital camera is changed from the photographing drive mode at the view angle B1 to a photographing drive mode at a view angle C, both described with reference to FIG. 15.

FIG. 19 is a timing diagram schematically showing a change from the photographing drive mode at the view angle B1 to the photographing drive mode of the view angle C in the digital camera 100. In the example shown in FIG. 19, the photographing drive mode at the view angle B1 is the first photographing mode, the photographing drive mode at the view angle B2 is the second photographing mode, and the photographing drive mode at the view angle C is realized by simultaneously executing the photographing drive mode at the view angle B1 and the photographing drive mode at the view angle B2.

First, it is assumed that image signals at the view angle B1 are output from the Ch2, the live view display and recording of the moving image are performed using the image signals, but no image signals are output from the Ch1. The driving of the image pickup device in the photographing drive mode at the view angle B2 is started at a predetermined timing so as to cause image signals at the view angle B2 to be output from the Ch1. Then, when the image signals output from the Ch1 become usable for the live view display and recording of the moving image, the image signals output from the Ch1 and the image signals output from the Ch2 are synthesized by the image processor 206, and development and following processing is performed using the generated synthesized signals as image signals. By thus synthesizing signals from the readout rows for the view angle B1 and signals from the readout rows for the view angle B2, it is possible to form the synthesized image signals at the view angle C for which thinning-out processing has not been performed, and by using the synthesized image signals, it is possible to perform the live view display and record the moving image without causing freezing of the live view display.

It preferable that a time period from output of the image signals at the view angle B1 from the Ch2 to output of the image signals to the display section 101 and the storage medium 130 after being subjected to the signal processing for the live view display and recording of the moving image is equal to a time period from output of the image signals at the view angle B1 from the Ch2 to output of the synthesized image signals to the display section 101 and the storage medium 130 after being subjected to the signal processing for the live view display and recording of the moving image.

Note that by causing the image signals at the view angle B2 to be output from the Ch2 in a state where the image signals at the view angle B1 is being output from the Ch1, and causing the image signals output from the Ch1 and the Ch2, respectively, to be synthesized by the image processor 206, it is also possible to obtain image signals at the view angle C. Further, also by causing the image signals at the view angle B1 to be output in a state where the image signals at the view angle B2 are being output in advance, similarly, it is possible to obtain the image signals at the view angle C.

According to the above-described control, even when the electronic zoom is performed for changing the drive mode from the photographing drive mode at the view angle B1 to the photographing drive mode at the view angle C during photographing of the moving image, it is possible to prevent discontinuity of the moving image recorded in the storage medium 130 from occurring, and further, it is possible to prevent discontinuity of the live view display from occurring.

A change from the view angle A to the view angle C can be realized, for example, by executing the process shown in FIG. 19 after execution of the process shown in FIG. 18.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-242742 filed Nov. 25, 2013 and Japanese Patent Application No. 2013-242743 filed Nov. 25, 2013, which are hereby incorporated by reference herein in their entirety.

What is claimed is:

1. An image pickup apparatus comprising:
an image pickup device including a plurality of pixels arranged in a two-dimensional manner and which outputs first image signals from a first pixel area of said plurality of pixels via a first hardware channel at least previously utilized for live view display and second image signals from a second pixel area of said plurality of pixels via a second hardware channel other than the first hardware channel, the second pixel area other than the first pixel area;
a setting unit which sets a drive mode for driving said image pickup device; and
a controller which changes images to be displayed from first images based on the first image signals outputted from the first pixel area of said plurality of pixels to second images based on the second image signals outputted from the second pixel area of said plurality of pixels other than the first pixel area during a time period during which the first image signals from the first pixel area of said plurality of pixels cannot be output due to a particular change in the drive mode set by said setting unit for outputting the first image signals from the first pixel area of said plurality of pixels according to the particular change in the drive mode.

2. The image pickup apparatus according to claim 1, wherein controller changes the images to be displayed from the second images to the first images, after completion of the particular change in the drive mode for outputting the first image signals.

3. The image pickup apparatus according to claim 1, further comprising a calculator which calculates an evaluation value based on the second image signals.

4. The image pickup apparatus according to claim 3, wherein the evaluation value includes (a) an auto-focus control value, (b) an exposure control value, (c) a white balance control value, (d) an object feature point detection value, (e) an object motion detection value, or a combination or subcombination of (a)-(e).

5. The image pickup apparatus according to claim 1, wherein, in a case where the drive mode is changed by the setting unit, a number of signal outputting rows for outputting image signals from ones of the plurality of pixels is changed.

6. The image pickup apparatus according to claim 1, wherein, in a case where the drive mode is changed by the setting unit, a thinning-out ratio of signal outputting rows for outputting image signals from ones of the plurality of pixels is changed.

7. The image pickup apparatus according to claim 1, wherein in a first drive mode set by the setting unit, the first image signals output via the first hardware channel are utilized for live view display and the second image signals output via the second hardware channel are utilized for autofocus evaluation, and in a second drive mode set by the setting unit, the first image signals output via the first hardware channel are utilized for live view display and the second image signals output via the second hardware channel are utilized for live view display.

8. The image pickup apparatus according to claim 1, wherein in a first drive mode set by the setting unit, the first image signals output via the first hardware channel are utilized for live view display and the second image signals output via the second hardware channel are utilized for live view display.

9. The image pickup apparatus according to claim 1, wherein in a first case, the second image signals output via the second hardware channel are utilized for autofocus evaluation, and in a second case, the second image signals output via the second hardware channel are utilized for live view display.

10. An image signal control method for controlling an image pickup apparatus including an image pickup device, the image pickup device including a plurality of pixels arranged in a two-dimensional manner, the method comprising:
outputting, from the image pickup device, first image signals from a first pixel area of said plurality of pixels via a first hardware channel at least previously utilized for live view display and second image signals from a second pixel area of said plurality of pixels via a second hardware channel other than the first hardware channel, the second pixel area other than the first pixel area;
setting a drive mode for driving the image pickup device; and
changing images to be displayed from first images based on the first image signals outputted from the first pixel area of said plurality of pixels to second images based on the second image signals outputted from the second pixel area of said plurality of pixels other than the first pixel area during a time period during which the first image signals from the first pixel area of said plurality of pixels cannot be output due to a particular change in the drive mode set by the setting for outputting the first image signals from the first pixel area of said plurality of pixels according to the particular change in the drive mode.

* * * * *